(12) United States Patent
Daisy-Cavaleri

(10) Patent No.: US 9,489,122 B2
(45) Date of Patent: *Nov. 8, 2016

(54) VIRTUAL PHONOGRAPH

(71) Applicant: Kyran Daisy-Cavaleri, Laurelton, NY (US)

(72) Inventor: Kyran Daisy-Cavaleri, Laurelton, NY (US)

(*) Notice: Subject to any disclaimer, the term of this patent is extended or adjusted under 35 U.S.C. 154(b) by 646 days.

This patent is subject to a terminal disclaimer.

(21) Appl. No.: 13/739,573

(22) Filed: Jan. 11, 2013

(65) Prior Publication Data

US 2013/0124993 A1 May 16, 2013

Related U.S. Application Data

(63) Continuation of application No. 12/582,436, filed on Oct. 20, 2009, now Pat. No. 8,369,974.

(60) Provisional application No. 61/268,858, filed on Jun. 16, 2009.

(51) Int. Cl.
*G06F 17/00* (2006.01)
*G06F 3/0488* (2013.01)

(52) U.S. Cl.
CPC .................. *G06F 3/0488* (2013.01)

(58) Field of Classification Search
CPC .................................................... G06F 3/0488
USPC ........................................................ 700/94
See application file for complete search history.

(56) References Cited

U.S. PATENT DOCUMENTS

| | | | |
|---|---|---|---|
| 6,342,665 B1 * | 1/2002 | Okita et al. ..................... 84/609 |
| 7,006,642 B1 | 2/2006 | Kumai | |
| 8,060,225 B2 | 11/2011 | Hans et al. | |
| 8,369,974 B2 | 2/2013 | Daisy | |
| 8,449,360 B2 * | 5/2013 | Stoddard et al. ................. 463/7 |
| 8,636,199 B1 | 1/2014 | Slayden et al. | |
| 2004/0024478 A1 * | 2/2004 | Hans et al. ..................... 700/94 |
| 2007/0227337 A1 | 10/2007 | Yoshikawa et al. | |
| 2007/0234889 A1 | 10/2007 | Rotolo de Moraes .......... 84/730 |
| 2007/0245881 A1 * | 10/2007 | Egozy et al. .................... 84/609 |
| 2008/0046098 A1 * | 2/2008 | Corbin et al. ..................... 700/1 |
| 2008/0071136 A1 * | 3/2008 | Oohashi et al. ............... 600/27 |
| 2008/0121092 A1 * | 5/2008 | Drel et al. ...................... 84/612 |
| 2008/0148922 A1 | 6/2008 | Morra | |
| 2008/0165141 A1 | 7/2008 | Christie | |
| 2009/0104956 A1 * | 4/2009 | Kay et al. ......................... 463/7 |

(Continued)

OTHER PUBLICATIONS

Ms. Pinky DJ controller documentation available at least Mar. 2009.*

(Continued)

*Primary Examiner* — Paul McCord
(74) *Attorney, Agent, or Firm* — Wilmer Cutler Pickering Hale and Dorr LLP

(57) ABSTRACT

A processor-implemented method to control a playback of recorded sound is provided. The method includes displaying on a pressure-sensitive display screen a processor-generated image of a vinyl record and playing, by use of a processor in communication with a processor storage, a sound encoded in the processor storage, to produce a playback of the encoded sound. The method also includes animating the processor-generated image of the vinyl record, to produce an animation of the vinyl record rotating in synchronicity with the playback. The method further includes detecting touch on the animation, the touch including at least one first touch and at least two second touches and controlling the playback and the animation in response to the detected touch.

16 Claims, 18 Drawing Sheets

(56) References Cited

U.S. PATENT DOCUMENTS

| | | |
|---|---|---|
| 2010/0014390 A1 | 1/2010 | Flum |
| 2010/0016079 A1* | 1/2010 | Jessop .............................. 463/39 |
| 2010/0033426 A1* | 2/2010 | Grant et al. ................... 345/156 |
| 2010/0313736 A1* | 12/2010 | Lenz ........................... 84/477 R |
| 2011/0021273 A1* | 1/2011 | Buckley et al. ................ 463/31 |
| 2012/0132057 A1* | 5/2012 | Kristensen ...................... 84/650 |

OTHER PUBLICATIONS

"Ots CD Scratch 1200 Quick Start Manual," Ots Corporation 1996-2008 (17 pages).

\* cited by examiner

VIRTUAL PHONOGRAPH

This application is a continuation of U.S. patent application Ser. No. 12/582,436, filed on Oct. 20, 2009, which claims priority to U.S. Provisional Patent Application No. 61/268,858, filed on Jun. 16, 2009, which is hereby incorporated by reference herein its entirety.

FIELD OF THE INVENTION

The invention relates to computer-based audio and music players.

DESCRIPTION OF RELATED ART

Computer-based audio and music players ("audio" and "music" are hereafter used interchangeably) have in many instances superseded traditional devices, such as phonographs, tape players, and even compact disc (CD) players. The ability to store music in a computer-readable format, e.g., digital file formats such as .mp3, .aud, .wav, etc., and then play that music using a computer-based device has many advantages over traditional playback devices. Those advantages include the following: making optional the need to purchase and use separate playback equipment (e.g., CD players, phonographs, etc.), making optional the need to have separate audio recordings with you to play them (e.g., CDs), making optional the need to load a desired audio recording onto the specialized recording equipment, quicker access to the computer-stored audio files, random access to those files, the ability to organize those files as desired (e.g., desired song order as opposed to fixed song order on a CD), the ability to modify those files as desired by digital editing of the music and/or file, and the ability to store large amounts of music on a computer device, depending on memory capacity. Current technology allows thousands of songs to be stored on playback devices that are about the size of a credit card.

Playback is not limited to specialized computer devices. Audio may be stored, played, created and edited on general purpose computers, and computer application programs may be designed for specific audio-related tasks. In the case of a portable computer, music may be played back wherever desired. Indeed, today, many music professionals and enthusiasts use portable computers and computerized devices.

However, one area that continues to use traditional playback equipment is disc-jockeying. Many disc jockeys ("DJ") continue to use phonograph turntables playing music recorded on "vinyl" records. This is because many DJ techniques, such as "scratching," are accomplished by using a physical record by physically manipulating the record, turntable speed, and turntable stylus. DJ-ing involves certain physical and musical skills. DJ's have different styles and techniques. Some have described DJ-ing as an "art."

For these reasons, DJs continue to use records and turntables. Previously known computer-based devices do not provide DJs with the same capabilities. They do not provide the same range of options and ability to manipulate playback. Previously-known computer-based devices that do permit manipulation of playback do so only with limited capability, as compared to traditional DJ equipment, with a very different interface that does not allow a DJ to duplicate traditional DJ-ing techniques.

SUMMARY OF THE INVENTION

The present invention provides a computer-based audio and music playback system that provides a virtual or computer-displayed audio-playback system in combination with a touch-sensitive interface that permits a user to manipulate the playback in a similar manner to a traditional physical turntable. The computer-displayed audio playback system preferably is a computer display of a record on a turntable, but other types of moving audio playback systems may be displayed such as a CD/DVR, a cassette tape, a reel-to-reel tape, etc. Some functions or effects described herein may physically correspond only to a record on a turntable (e.g., a scratching effect), but may be implemented on a display screen using a display of any type of moving audio playback system.

In accord with an embodiment of the invention, computer-readable audio files are stored on a computer or other storage device. When a user-selected computer-readable audio file is played using audio-playing software, a virtual record and stylus are displayed on a touch screen and animated and moved in a manner similar to how a physical record and stylus would move on a conventional turntable if the sound was recorded on a physical record rather than an audio file. The playback of the audio may then be controlled or manipulated by touching the virtual record or stylus on the touch screen and, by moving the user's finger (or other object touching the screen) along the screen, dragging the touched object to a desired position on the screen. The position of the object is displayed on the screen in accordance with how it is moved by the user. Concurrently, the playback of the audio file is adjusted or moved to a different point in the file in accordance to how the record or stylus is moved. When the user ceases touching the object, playback continues forward normally from that point. Accordingly, the user may control the playing of the audio in a similar manner as touching the record or moving the stylus of a conventional turntable system. In embodiments having a pressure-detecting touch screen, the movement of the virtual record may be adjusted in correlation with the pressure the user exerts against the touch screen.

Systems of the invention may read, play and mix audio from multiple internal and external sources, and has touch screen controls for playing and mixing of those multiple sources as desired by the user. It may also store user-created mixes and music in audio files, which may be exported and/or used in other units or audio playback devices, or may save them to other audio media. The system may have input devices in addition to a touch screen for controlling system operation and audio playback. The system may further contain or be interfaced with video media, which may be displayed with the audio playback.

A user may also control playback by setting up and activating cue points, loops and playback points, which play certain portions of the audio file or begin/continue playback at particular points. Such may be visually displayed on the touch screen, and further may be activated/deactivated by touching the screen or by using other input devices.

In accord with one or more embodiments of the invention, there is provided a processor-implemented method to control a playback of recorded sound, including at least displaying on a display screen a processor-generated image of a sound recording medium. Next, the method includes playing, by use of a processor in communication with a processor storage, a sound encoded in the processor storage, to produce a playback. Next, the method includes animating the processor-generated image of the sound recording medium, to produce an animation in synchronicity with the playback. Next, the method includes detecting a touch on the animation, to produce a detected touch. Next, the method includes controlling the playback and the animation, responsive to the detected touch, to produce a control of the playback and the animation.

Optionally, the processor-generated image of a sound recording medium may be an image of a vinyl record. The touch may include a substantially linear touching motion, with the playback and the animation being advanced or retarded in response to a direction of the substantially linear touching motion. The animation may be a rotating image having a direction of rotation, with the touch being a substantially linear touching motion, and the playback being a scratching sound. The touching motion that produces a scratching sound may be substantially perpendicular to the direction of rotation of the animation. The touch may be a pressure, and the step of controlling the playback and the animation may include varying a speed of the playback and the animation in response to the pressure. The method may further include the step of mixing the playback with a playback of another sound encoded in a processor storage. The method may further include the step of moving a playback point within the playback, responsive to the detected touch. The touch may include a dragging of a processor-generated image of a stylus across a processor-generated image of a vinyl record. The method may further include detecting an information of the sound, to produce a detected information, associating the detected information with the sound, to produce an association, and storing, in the processor storage, the detected information and the association. Controlling the playback and the animation may include remotely controlling the playback on a remote processor, by use of the animation, with the animation being produced by a second processor. The method may further include playing, by use of the processor in communication with the processor storage, a video encoded in a processor storage, to produce a video playback, with the animation being in synchronicity with the video playback.

In accord with one or more embodiments of the invention, there is provided a processor memory encoded with software for controlling playback of a recorded sound, including memory to store a process to display on a display screen a processor-generated image of a sound recording medium; to store a process to play, by use of a processor in communication with the processor storage, a sound encoded in the processor storage, to produce a playback; to store a process to animate the image of the sound recording medium, to produce an animation in synchronicity with the playback; to store a process to detect a touch on the animation, to produce a detected touch; and to store a process to control the playback and the animation, responsive to the detected touch, to produce a control of the playback and the animation.

Optionally, processor memory may further be encoded with software to create a display information about the sound. The processor memory may further be encoded with software to move, on the display screen, the display of information about the sound.

In accord with one or more embodiments of the invention, there is provided a system to control the playback of recorded sound, the system including a first processor in communication with a processor storage, the processor configured to play a sound encoded in the processor storage, to produce a playback, and a display screen in communication with the first processor, in which the display screen is configured to display: a processor-generated image of a sound recording medium; and a processor-generated animation of the image of the sound recording medium, the processor-generated animation in synchronicity with the playback; the display screen being configured to detect a touch on the animation, to produce a detected touch; and the display screen being configured to display a processor-controlled animation, in which the playback and the animation is responsive to the detected touch, in order to control the playback and the animation.

Optionally, the system may further include a communication link between the first processor and a second processor, in which the first processor is configured to control playing a sound by the second processor. The first processor may be configurable to be one of a master of the second processor and a slave of the second processor. The system may further include an interface to connect the first processor to an external sound source. The system may also include tutorials and help functions for training users.

In accordance with one or more embodiments of the invention, there is provided a processor-implemented method to control a playback of recorded sound. The method includes displaying on a pressure-sensitive display screen a processor-generated image of a vinyl record and playing, by use of a processor in communication with a processor storage, a sound encoded in the processor storage, to produce a playback of the encoded sound. The method also includes animating the processor-generated image of the vinyl record, to produce an animation of the vinyl record rotating in synchronicity with the playback. The method further includes detecting touch on the animation and controlling the playback and the animation in response to the detected touch, wherein the controlling of the playback and the animation includes adjusting a speed of the playback and a speed of the corresponding vinyl record rotation in correlation with an amount of pressure exerted by the detected touch on a portion of the pressure-sensitive screen that is used to display the image of vinyl record.

The method further includes detecting, by use of the processor, at least one external playback device and establishing a separate connection with one or more of the at least one detected external playback device. The method further includes generating a battle cue window on the pressure-sensitive display screen in response to establishing a first of the established connections and enabling a user to initiate a battle cue challenge against another user by sending a battle cue including at least one cue point to one of the connected external playback devices that is used by the another user. A cue point includes at least one of: a song, a part of a song, a part of an encoded sound, a beat sample, a bridge, a vocal line, a video clip and a part of a video clip. The method further includes enabling a user to control at least one aspect of the playback, including providing a pitch control having a virtual sliding bar and a pitch lock on the pressure-sensitive display screen. The pitch control enables the user to control a pitch and a tempo of the playback by adjusting the virtual sliding bar and the pitch lock enables the user to adjust the tempo of the playback without affecting a quality of the playback vocal.

The method further includes, in response to receiving a battle cue from one of the connected external playback devices, displaying on the battle cue window the received battle cue and enabling the user to choose to accept or decline the received battle cue using a prompt window displayed on the pressure-sensitive display screen. If the user accepts the received battle cue, the method further includes enabling the user to mix the received battle cue with the playback being played. The sending of a battle cue to one of the connected external playback devices includes detecting (1) a touch of one of (i) the processor-generated image of the vinyl record or (ii) a cue point that is graphically overlaid on the vinyl record image followed by (2) a touching motion of sliding the selected image across the pressure-sensitive display screen towards a top of the display screen in a direction of the intended one of the connected external playback devices, and transmitting the battle cue to the intended one of the connected external playback devices through the corresponding connection.

The direction of the intended one of the connected external playback devices is determined based on knowledge of a location of the intended one of the connected external playback devices. The knowledge of the location includes an actual physical location of the intended external playback device and a conceptual location of the intended external playback device based on one of a triangulated location point, a user provided input, or an input from a position locating system, that is related to the actual physical location of the intended external playback device. The method further includes enabling a user to set up at least one of one or more playbacks and a mixing of a plurality of playbacks, wherein the mixing of a plurality of playbacks includes at least one of creating one or more playlists, identifying one or more tracks in a plurality of songs or playbacks, determining beats per minutes (BPMs) and key of the identified tracks, designating one or more cue points, and setting introduction parameters of the identified tracks. The method further includes storing information including details of the mixing of the plurality of playbacks and exporting the information.

In accordance with one or more embodiments of the invention, there is provided a system to control playback of recorded sound. The system includes a processor in communication with a processor storage and a pressure-sensitive display screen in communication with the first processor. The processor is configured to play a sound encoded in the processor storage. The display screen is configured to display a processor-generated image of a vinyl record. The display screen is also configured to display a processor-generated animation of the image of the vinyl record rotating in synchronicity with the playback. The display screen is configured to detect touch on the animation and to display a processor-controlled animation. The playback and the animation are responsive to the detected touch to control the playback and the animation. The controlling of the playback and the animation includes adjusting a speed of the playback and a speed of the corresponding vinyl record rotation in correlation with an amount of pressure exerted by the detected touch on a portion of the pressure-sensitive screen that is used to display the image of the vinyl record.

The processor is further configured to detect at least one external playback device and establish a separate connection with one or more of the at least one detected external playback device. The pressure-sensitive display screen is further configured to generate a battle cue window in response to establishing a first of the established connections and enable a user to initiate a battle cue challenge against another user by sending a battle cue including at least one cue point to one of the connected external playback devices that is used by the another user. A cue point includes at least one of a song, a part of a song, a part of an encoded sound, a beat sample, a bridge, a vocal line, a video clip and a part of a video clip.

The pressure-sensitive display screen is further configured to display a battle cue on the battle cue window in response to receiving the battle cue from one of the connected external playback devices. The display screen is further configured to enable the user to choose to accept or decline the received battle cue using a prompt window and to enable the user to mix the received battle cue with the playback being played, if the user accepts the received battle cue. The display screen is further configured to enable a user to control at least one aspect of the playback, including providing a pitch control having a virtual sliding bar and a pitch lock. The pitch control enables the user to control a pitch and a tempo of the playback by adjusting the virtual sliding bar and the pitch lock enables the user to adjust the tempo of the playback without affecting a quality of the playback vocal.

The pressure-sensitive display screen is further configured to enable a user to set up at least one of one or more playbacks and a mixing of a plurality of playbacks, wherein the mixing of a plurality of playbacks includes at least one of creating one or more playlists, identifying one or more tracks in a plurality of songs or playbacks, determining beats per minutes (BPMs) and key of the identified tracks, designating one or more cue points, and setting introduction parameters of the identified tracks. The processor is further configured to store information including details of the mixing of the plurality of playbacks and export the information.

In accordance with one or more embodiments of the invention, there is provided a non-transitory computer-readable medium containing computer executable instructions that, when executed by a processor, cause the processor to perform a method for controlling playback of a recorded sound. The method includes displaying on a pressure-sensitive display screen a processor-generated image of a sound recording medium including an image of a vinyl record and playing, by use of a processor in communication with a processor storage, a sound encoded in the processor storage, to produce a playback of the encoded sound. The method also includes animating the processor-generated image of the sound recording medium, to produce an animation of the vinyl record rotating in synchronicity with the playback. The method further includes detecting touch on the animation and controlling the playback and the animation in response to the detected touch. The controlling of the playback and the animation includes adjusting a speed of the playback and a speed of the corresponding vinyl record rotation in correlation with an amount of pressure exerted by the detected touch on a portion of the pressure-sensitive screen that is used to display the image of vinyl record.

BRIEF DESCRIPTION OF THE DRAWINGS

The foregoing and other features of the present invention will be more readily apparent from the following detailed description and drawings of illustrative embodiments of the invention where like reference numbers refer to similar elements throughout and in which.

DETAILED DESCRIPTION

Figure 1:
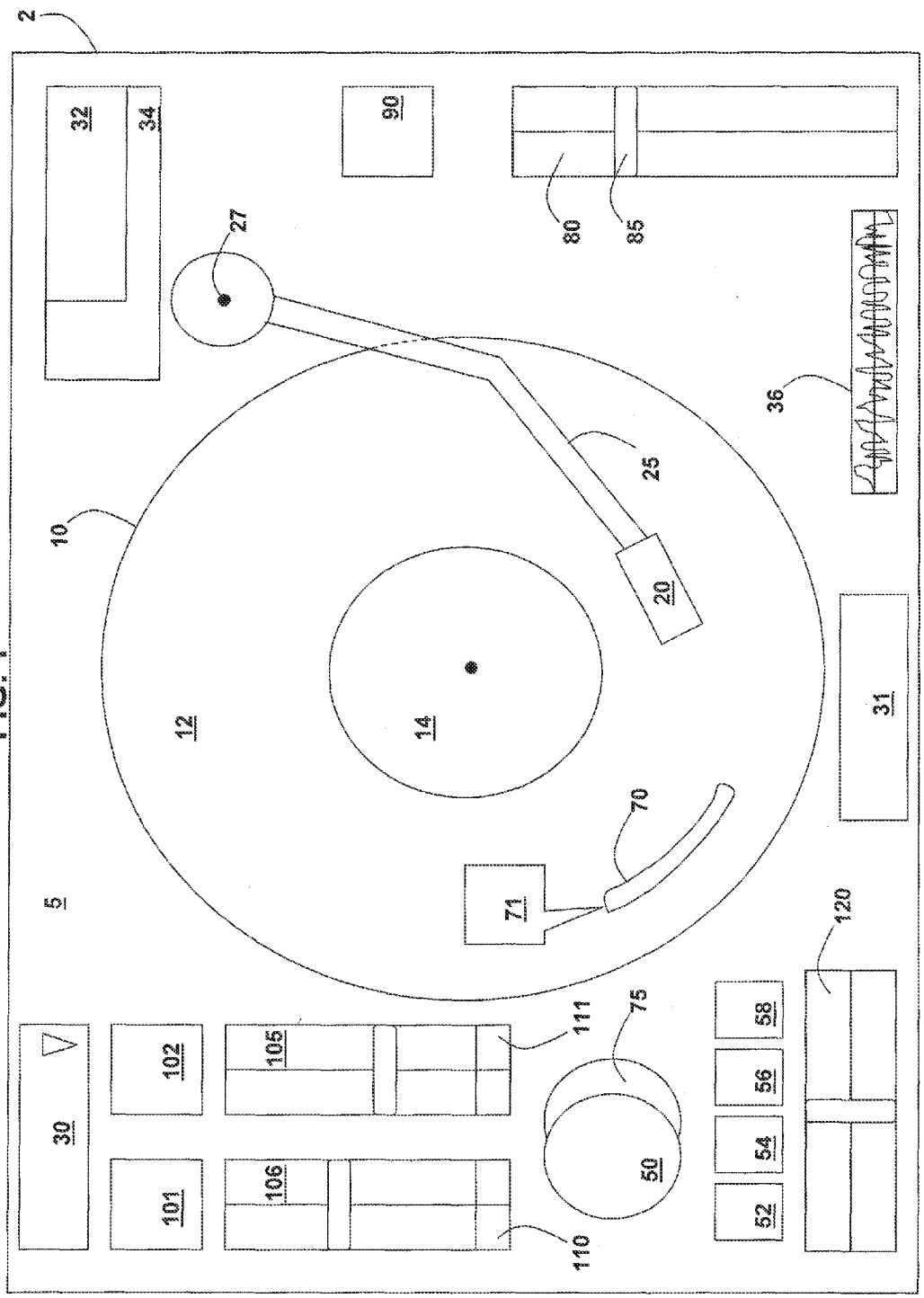
FIG. 1 shows an exemplary schematic of a virtual phonograph system user interface in accordance with some embodiments of the invention.
Figure 2:
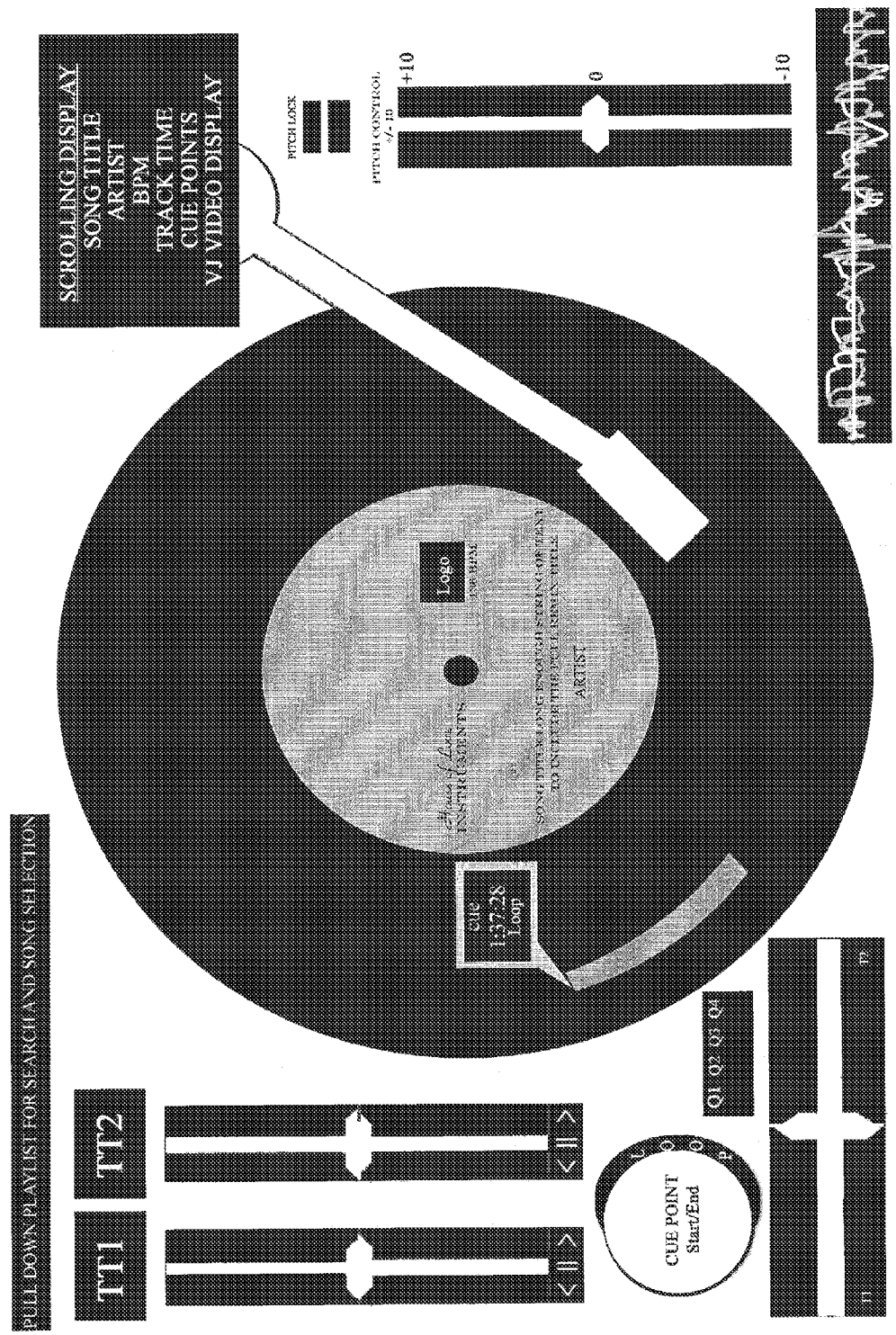
FIG. 2 shows an example of a virtual phonograph system user interface in accordance with some embodiments of the invention as displayed on a display screen.

FIGS. 1 and 2 show a virtual phonograph system user interface. The interface is displayed on a monitor or computer screen. The screen is touch-sensitive in that it detects when an object contacts the screen, e.g., a person's finger or a stylus, and where on the screen such contact occurs. Such touch-sensitive monitors and screens are known to those of ordinary skill in the art. The screen should be able to detect contact at an appropriate force threshold, such that it does not require excessive force to register that contact has been made. Conversely, the register-able force threshold should be high enough to avoid being triggered by inadvertent contact or contact by very lightweight objects. The detection thresholds may be set and/or adjustable as is known in the art. The thresholds may also be adjusted and/or set by the user, as is known in the art, to the user's preferences. In addition, the screen may be pressure-sensitive, so that it detects the force with which it is being touched. It should be understood that certain details of the virtual phonograph system user interface are exemplary in nature, and may be displayed differently in alternate embodiments without significantly affecting the utility of the present invention. Such exemplary details may include, but are not limited to: locations and sizes of controls; type of control (e.g., slider vs. rotary wheel, etc.); colors; hiding/displaying controls; messages; etc. Certain interface design details may be within the discretion of system software design, or may be modifiable by the user and thus within the user's discretionary control (e.g., floating controls).

The screen is interfaced to and driven by a computer. This may be any computer that is capable of driving the display and performing the other functions of the virtual phonograph system, as described herein, as would be understood by those of ordinary skill in the art. The computer is capable of receiving and processing the touch/pressure signals from the monitor. The computer may be separate from the monitor and interfaced thereto by any appropriate manner, e.g., via cable, wireless transmission, Internet, Bluetooth, infrared, etc. Alternatively, the computer and monitor may be integrated, such as, for example, a tablet PC. The computer may be general purpose or dedicated to the virtual phonograph system. The computer and monitor system may be of suitable size, weight and configuration to be portable, and may also be made sturdy enough to resist damage when moved or handled.

The computer has storage capability to store audio and music in computer-readable format. This storage may be, for example, an internal or external hard drive, CD or DVD drive, internal memory, or static memory storage devices, such as, by way of example, memory cards, memory sticks and USB drives. The storage may be local to the computer, or may be networked such that the storage is local to a second computer but is accessible to a first computer via a communication link such as Ethernet, WiFi, Bluetooth, etc. The computer also has a processor or processors, and other components, with appropriate software, as will all be understood by those skilled in the art, to access the storage and read the audio files. The computer may also have the capability, through software and other components, to create, edit, modify and store audio files, e.g., creating mixes, including external devices, e.g., external hard drives, CD/DVD drives, flash memory devices, etc. The system may have the capability to store and play multiple audio file formats, with the capability of being updated to accommodate new formats. The system may also have the capability to store, edit, and play video, in conjunction with the audio, stored in computer-readable, e.g., digital, video files.

The system may further include a keyboard, either a physical keyboard interfaced with the computer, or a virtual one on the touch screen. Using the keyboard, a user can enter alphanumeric data, operate system features, or operate the computer in general. For example, a keyboard may be used to enter names of songs or mixes as desired by the user. The system may also include other input devices as are known, such as, for example, a computer mouse.

The system may also contain or interface with, and drive, other components, such as, for example, sound mixers, sequencers, audio sound processors, amplifiers, and loudspeakers. Audio processing may include, by way of example, surround sound capabilities, throwing sounds with acoustics, dimensional space, and atmosphere effects such as, e.g., underwater, arena, echo, rooms and spaces, etc. In embodiments having video capabilities, the system may also contain or interface with and drive a video display system, e.g., a video projector or monitor. Those of skill in the art will understand how to integrate such components and features in systems of the present invention.

In addition, the monitor may interface with more than one computer. In such embodiments, the user may select which computer output to display on the monitor, or may display multiple computer outputs in a "split screen" display. This permits a user to play and mix multiple audio files at one time. It also permits, for example, a user to prepare the system to play the next song, so there is no delay between songs.

As the computer reads and plays an audio file, it generates a display on the screen in accordance with the music being played. In FIGS. 1 and 2, the computer displays on the screen 2 a virtual turntable system 5 with the image of a record 10 and a stylus 20. The record 10 has a music-containing portion 12 and a label portion 14. The label 14 may display information regarding the song, such as the title or artist, or other information such as graphics, song length, or other user-defined information. As the audio is being played, the record image 10 rotates as a record does in a conventional turntable.

With conventional "vinyl" records, the audio is recorded via a spiral grove that begins near the external circumference of the record and spirals toward the center of the record. The stylus is placed into the groove, and as the turntable spins the record, the stylus follows the groove, tracking toward the center of the record with the groove. According to embodiments of the invention, this process is duplicated in the virtual phonograph system. The record 10 spins at the same speed, e.g., the same rpm, and the stylus 20 tracks along the music portion 12 toward the label 14 in the same manner as if the song was recorded on a physical record. The system does this by using information about the song that is stored with the audio file, such as the total time, and calculates how the stylus 20 moves. In addition, the location of the stylus 20 on the music portion 12 at any point in time correlates with the point in the audio file that is presently being played. In this manner, a virtual representation of a physical turntable playing a record is displayed on the screen.

Because a conventional turntable rotates at a constant angular speed (i.e., constant RPM), the linear speed of vinyl past the stylus 20 will vary as a function of the distance of the stylus 20 from the center of the record. The linear speed will be greatest near the outer circumferential edge of the music portion 12, and the linear speed will be the smallest near the inner circumferential portion of music portion 12. When simulating the response of a physical turntable, this effect will be accommodated in the programming code to keep the movement and playback in sync.

An audio file may be selected via the user interface. Pull down menu 30 expands when touched by the user, permitting the user to access various menu options. The user may browse or search, optionally in combination with a keyboard, mouse or other input device, a database of stored audio files, video files, and playlists. The user may also access, in embodiments containing such components, linked or attached sources, such as external devices, CD/DVD drives 31, the internet, etc. The user may select the song or video to be played, by touching the selection listing on the screen 2, or alternatively, by using other input devices, e.g., keyboard, mouse, etc. Additional available options on the pull down menu 30 may include, for example, system control options, such as turning off the system, display options, system settings, language, changing mode, etc. These may be selected in like manner.

Once a song is selected, various information may be displayed on the system 5. Audio information display 32 may display information about the audio file. These may include, for example, song title, artist, track, file, total song or track time, song tempo, e.g., beats per minute (BPM), which may be detected and calculated by the system software from the audio file, selected cue point, and playing time. Some or all of this information may be presented in a scrolling format. In embodiments having video capability, a video display 34 may show the video being played, and include video information, for example, title, time/duration and cue points. This information may be overlaid in small font over the video, and may also be presented in a scrolling manner. The video display 34 may be the same or of a different size than the audio information display 32, and in various embodiments, both may be adjusted in size by the user according to preference. Further embodiments may include a sound wave display 36, visually displaying the audio waveform.

The correlation of the location of the stylus 20 on the music portion 12 and the stored audio file being played permits the playback of the audio to be manipulated using the touch screen 2 in a manner similar to that of a conventional physical turntable system. For example, by touching the screen 2 where the stylus 20 is located, the screen senses the user's touch and allows the user to move the stylus to a different location on the music portion 12 (or off the music portion) by moving the user's finger (or however else the user has touched the screen, e.g., stylus, etc.) along the screen 2 to the desired location. When the user ceases touching the screen, the point of playback in the audio file is correlated to the new position of the stylus 20 on the music portion 12, and the audio playback continues at that point in the audio file. Thus, the user can "drop and drag" the stylus to the desired point of playback of the song. It should be noted that the movement of the stylus 20 is constrained by stylus arm 25 as with a conventional turntable. Thus, the stylus may be moved in an arc with a radius of that of the radius of the stylus arm 25 around the stylus arm pivot point 27. It should also be noted that if the stylus 20 is moved off the music portion 12, the song will cease to playback. If the stylus 20 is moved to the label portion 14, for example, the playback point in the audio file will move to the end of the file. Conversely, if the stylus 20 is moved outside the external circumference of the music portion 12, the playback point in the audio file will move to the beginning of the file.

The user may also designate a playback point by specifying the desired playback time, e.g., using a keyboard. For example, the user may specify that playback should begin, or continue, at 2 m 00 s from the start of the song. This may be done in advance of the song being played, or during a song, to continue playback at a different location in the audio file. The playback points may be saved in the computer storage in connection with the audio file for recall when the audio file is later selected. In additional embodiments, the playback points are displayed in overlay on the music portion 12, identifying the point on the music portion 12 corresponding to the time of the playback point (see FIG. 2). In further embodiments of the invention, the playback point may be activated by touching the playback point overlay display, whereupon the audio file continues playback at the playback point. When a playback point is activated, the displayed location of the stylus 20 on the music portion 12 may move to correlate with the position in the audio file being played, as described above.

In yet additional embodiments of the invention, the user may create and use cue points to further customize playback. The cue point control 50 is a touch control. A user may designate a cue point during playback by touching the cue point control 50 at a desired point during playback to begin the cue point, and touching the cue point control 50 again to end the cue point. This allows the user to designate a desired portion of the audio file, such as, e.g., a beat sample, bridge or vocal line as a drop in point. Alternatively, the cue point may be designated by other system input means, e.g., keyboard, and may be made prior to playback. In various embodiments, multiple cue points may be created.

Each cue point may be given a designated name, and correlated with a cue point activation control 52, 54, 56, 58 displayed on the screen 2. The cue point parameters may be displayed in its cue point activation control. It should be noted that while FIGS. 1 and 2 show four cue point activation controls, this is but an example and the number may be varied. Touching a cue point activation control 52, 54, 56, 58 will also skip playback to that point in the song. The position of the stylus 20 and music portion 12 will also be adjusted to correlate therewith. In addition, the color of the currently selected cue point may be changed, e.g., highlighted, to indicate it is in use.

In additional embodiments, a cue point may be graphically overlaid 70, by way of example only, as a highlighted area, on the music portion 12, identifying the location and duration of the cue point on the virtual record. The cue point overlay 70 may also display information about the cue point in an associated display 71, which may be called up by touching the overlay 70. Alternatively, touching the cue point overlay 70 may activate the cue point. In various embodiments of the invention, the user may be able to select the function of touching the cue point overlay 70. In further aspects of the invention, the appearance of the cue point overlay 70 may change, e.g., change color, when the cue point is activated. Where multiple cue points are designated, they may also be displayed as overlays on the music portion 12. In some embodiments, the cue points may be differently displayed, e.g., different colors, to make them quickly distinguishable.

A loop control 75, will loop, or repeat, the selected cue point when touched or activated. If the loop control 75 is active, the cue point will repeat until the loop control 75 is touched again or de-activated. If the loop control 75 is not active, when a cue point is activated, the playback will jump to cue point in the song, play once and the song will continue from that point.

Another manner in which audio playback may be controlled is by manipulating the record 10 via the touch screen 2. By touching the record 10, a user can control its spinning as one could with a physical record. A user can move the record 10 by touching it and dragging it along the screen, similarly to how the stylus is moved as described above. It should be noted that the movement of the record 10 is in the circumferential direction, with the effect of fast-forwarding, slowing, or rewinding playback of the audio file. The amount of fast-forward, slowing, or rewinding corresponds to how fast the record 10 is moved by touching it. Slowing record 10 and rewinding record 10 are collectively referred herein as retarding record 10. For example, moving the record in the forward direction at twice the normal rotational speed will cause playback to be at twice normal speed. As another example, by moving the record 10 backwards and forwards with sufficient speed, a user can "scratch" as can be done using a conventional turntable and record. A scratching sound effect can also be produced by touching and dragging stylus 20 across record 10, perpendicular to the direction of rotation of record 10.

Figure 13A:
FIGS. 13A-13C show an exemplary schematic view of the user interface when a user exerts pressure against the interface.
Figure 13B:
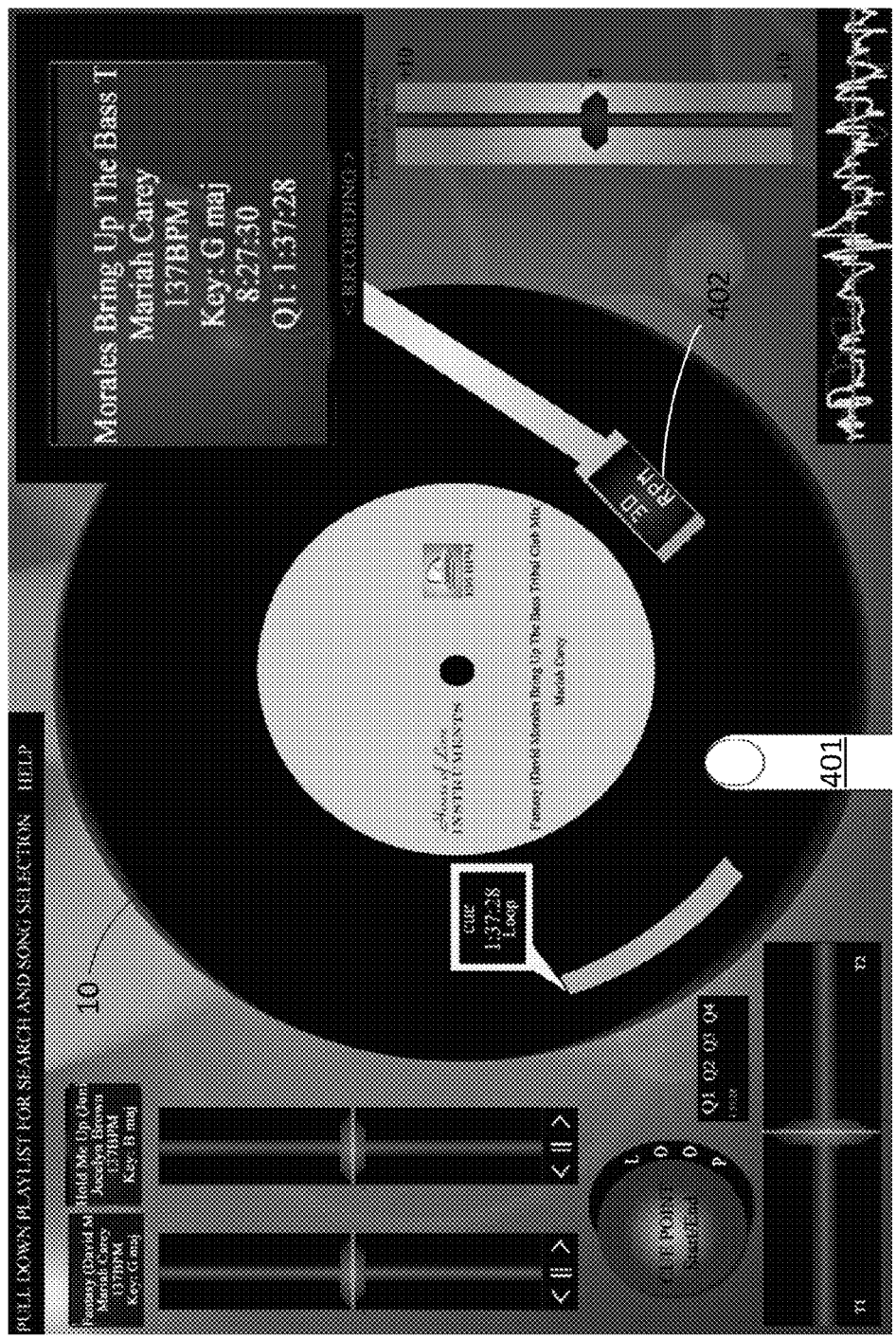
Figure 13C:

In embodiments with a pressure-sensitive touch screen 2, for example, as shown in FIGS. 13A-13C, the movement of the record 10 is dependent upon the pressure exerted. A comparatively light pressure 401, shown in FIG. 13B, exerted on the record 10 will merely slow down its forward rotation, 402, correspondingly slowing down the playback of the audio file. Further pressure exertion, 411, shown in FIG. 13C, will further slow down rotation, 412, and playback. Sufficient pressure will stop the rotation and playback, with record 10 motion then controlled by dragging it as described above. In such manner, the invention can mimic the pressure-dependent effect of touching on a convention turntable system. Moreover, effect of pressure on the touch screen 2 may be correlated, through the computer playback software, to the effect of pressure on a conventional turntable, such that a certain pressure on the virtual record 10 will have a similar effect on playback as a similar pressure exerted on a physical record. Such correlation may make it easier for a user to duplicate what the user does on a conventional system.

In effect, moving the record can speed up, slow down, or rewind the music, tapping it into sync with the other song in the mix or physically rewinding the record to play back a section or hold it to pause it at a specific point. A user can play, mix and scratch records in real time as if working with physical records. Tapping into sync is known to persons of skill in the art as a process used when two copies of a sound recording (e.g., representing two separate vinyl records) are played slightly out of time together. Touching one record slightly can nudge the two recordings into sync in time by pushing the touched record forward slightly to speed it up or pulling the touched record backwards slightly to slow it down. The touch to accomplish this action can be in the form of a tapping.

The system may also include a pitch control 80. The pitch control utilizes a virtual slider 85, which a user can touch and drag along the pitch control 80 to control the pitch and tempo of playback within a range, e.g., +/−10% of the original tempo as measured in beats per minute ("BPM"), wherein 0% represents the original tempo. In this manner, the user can increase or decrease the tempo of the music as desired. For example, the user can use the pitch control 80 to match the beat of a song being mixed into (e.g., the one currently playing to the audience). The pitch control 80 may operate with set increments or on a continuous scale, which in various embodiments may be set by the user. The system may also have a pitch lock 90, which when activated by touch control allows the tempo to be adjusted without affecting the quality of the vocal on the track. Thus, the music speeds up or slows down, but the vocal portion does not increase or decrease in pitch as it does.

The system 5 may also contain mixer controls, for mixing multiple audio playbacks or sources. As noted above, when the multiple sources are two virtual records, for example, the two may be shown as two separate turntables in split screen mode. It should be understood, though, that the system 5 may mix any sources, virtual or physical when connected to the system, and may be configured to mix more than two sources. Thus, the system 5 may mix as many channels as there are inputs, whether virtual or physical. The system 5 will be used to mix and control at least two devices at a time, with the option of mixing and controlling additional audio input from additional media sources. A split-screen user interface may be employed.

Source information windows 101, 102 may display various information about the sources, e.g., song title, artist, BPM and track time for the song playing on each turntable, which in various embodiments may be user-selected. Source volume controls 105, 106 control the volume level of each source in the mix. Source mode controls 110, 111 control the operation of the sources, e.g., play/pause, rewind and fast forward options. The source mode controls 110, 111 may be highlighted and/or change color when in use or to designate the source operation mode. A crossfader 120 phases from one source to the other as the user desires. Again, while the embodiments of the Figures show only two sources, the invention is not limited to two sources, and similar controls and displays may be shown on the screen 2 for additional sources.

The virtual phonograph system may also include a premixed play mode. This mode permits a user to set up playback and mixing in advance by detecting and/or associating information about the track with the track itself. For example, it allows a user to create playlists, identify tracks, determine track BPM (by playing the music through integrated BPM software), designate cue points, detect and set intro parameters, and store track and playback details. This information may be stored in the computer storage and may be recalled when the audio is recalled or played. In certain embodiments, this data may also be exported, either separately or with the audio file (e.g., in a new file format or tag), for use with another system.

The system of the invention may further include tutorials and help functions to train users in audio and video use of the system.

Operation of an embodiment of the invention will be described below by reference to a typical usage session. It should be understood that the description below is not limiting, and that the functions or operations described can be performed in a different order unless the context indicates otherwise. Further, certain functions or operations may be omitted or repeated without detracting as an example of usage.

Figure 3:
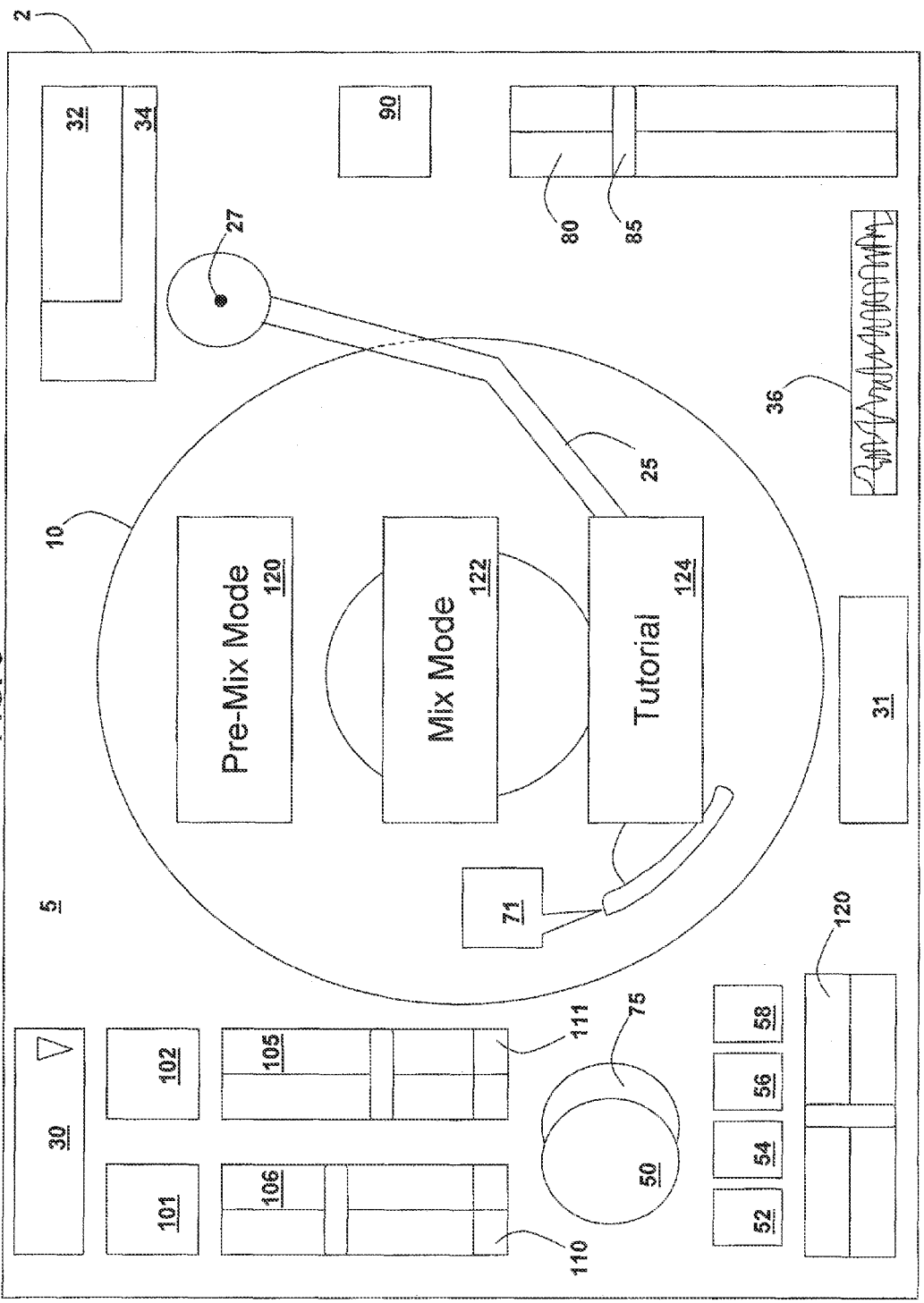
FIG. 3 shows an exemplary schematic view of the user interface when the user is prompted for the operating mode upon startup in accordance with some embodiments of the invention.

Upon startup of the system, while the system is booting up, a splash screen with the software name and company logo typically will be displayed for a short period of time before the user interface of FIG. 1 is displayed. When boot-up is complete, the user may be offered the choice of entering one of "Pre-Mix Mode," "Mix Mode," and "Tutorial" by activating one of controls 120, 122, and 124, respectively, as illustrated in FIG. 3.

Mix mode is a mode of operation in which the system will play a track and detect track details if the track details are already in system, similarly to a record player in a professional mixing system. The user may designate the system as either a primary system or a secondary system. Ordinarily, in a professional mixing system, only one mixer controls playback to the audience for all attached devices. In embodiments of the present invention, the primary unit will display a mixer and uses the mixer to control contributions from both the primary unit and the secondary unit into the mix. The secondary unit will not display the mixer, or have an ability to control the mix. Although the secondary unit will have all of the turntable functions, the secondary unit in this mode of operation is limited substantially to playing back an audio or video file that is loaded onto the secondary unit.

Pre-Mix mode is a mode of operation which allows a user to set up a playlist and store information about track details, such as identification of tracks, BPM of the track, cue points, etc. Tracks may be played in Pre-Mix mode to assist in collecting the track information, such as the BPM, or the identification of introductory parameters of a track. It may be desirable to identify the introductory parameters of the track for situations in which a parameter of an introductory portion of the track differs from the same parameter later in the track. For instance, certain tracks are known to have an introductory portion (i.e., an interlude) having a different tempo than a tempo used for a portion of the track beyond the interlude. The introductory portion my have a slower tempo (e.g., for a spoken word or ballad interlude) than that of the portion of the track beyond the interlude. Often an interlude will start with a slow tempo, then the tempo will speed up beyond the interlude. It is often desirable to skip the interlude when mixing, therefore identifying the interlude will allow the user to mark the interlude and omit it if desired. Cue points can be set accordingly to skip the interlude. Information about the change in track parameters within a track can be stored in the system's memory and may be recalled by the system when the same track is replayed on the system. An export option allows this data to be transferred to another unit, or stored with the track as a new file format or tag.

Harmonic mixing is a phase of the Pre-Mix mode of operation that supports the following operations: key chart, major and minor key detection, modal keys, adds key to the tag of the track, displays key in display window. Harmonic mixing recognizes that, in music theory, certain keys sound better together. Songs may be played with complimentary keys to avoid clashes and dissonance in the mix. Keys that are a certain tonal interval apart play well together.

Figure 4:
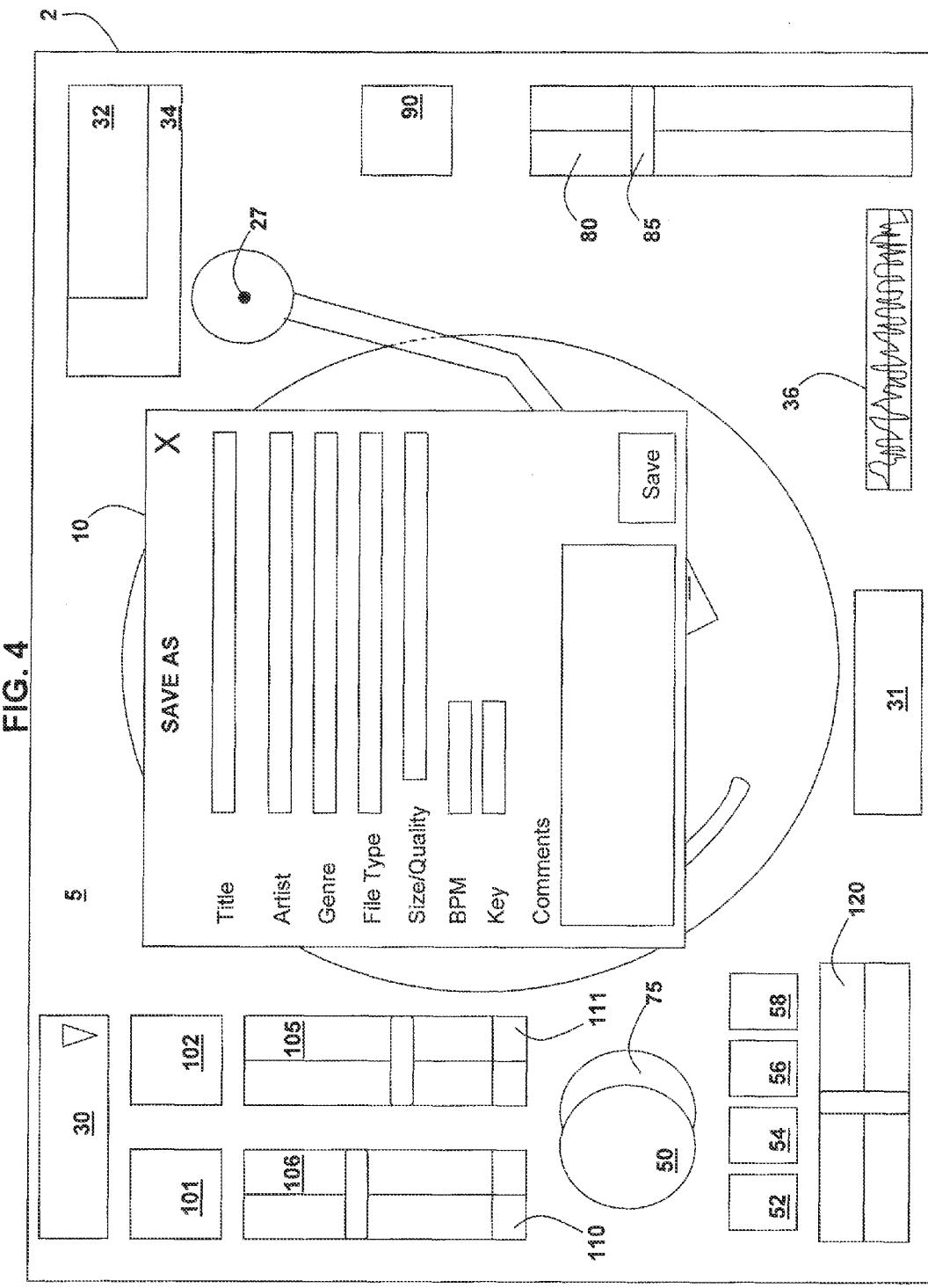
FIG. 4 shows an exemplary schematic view of the user interface when saving a track in accordance with some embodiments of the invention.

When exiting Pre-Mix mode, tracks can be scanned for track length and other track-related details, which can be added by the system in fields associated with the track when the "Save As" prompt is displayed. FIG. 4 shows an exemplary "Save As" prompt.

Figure 5:
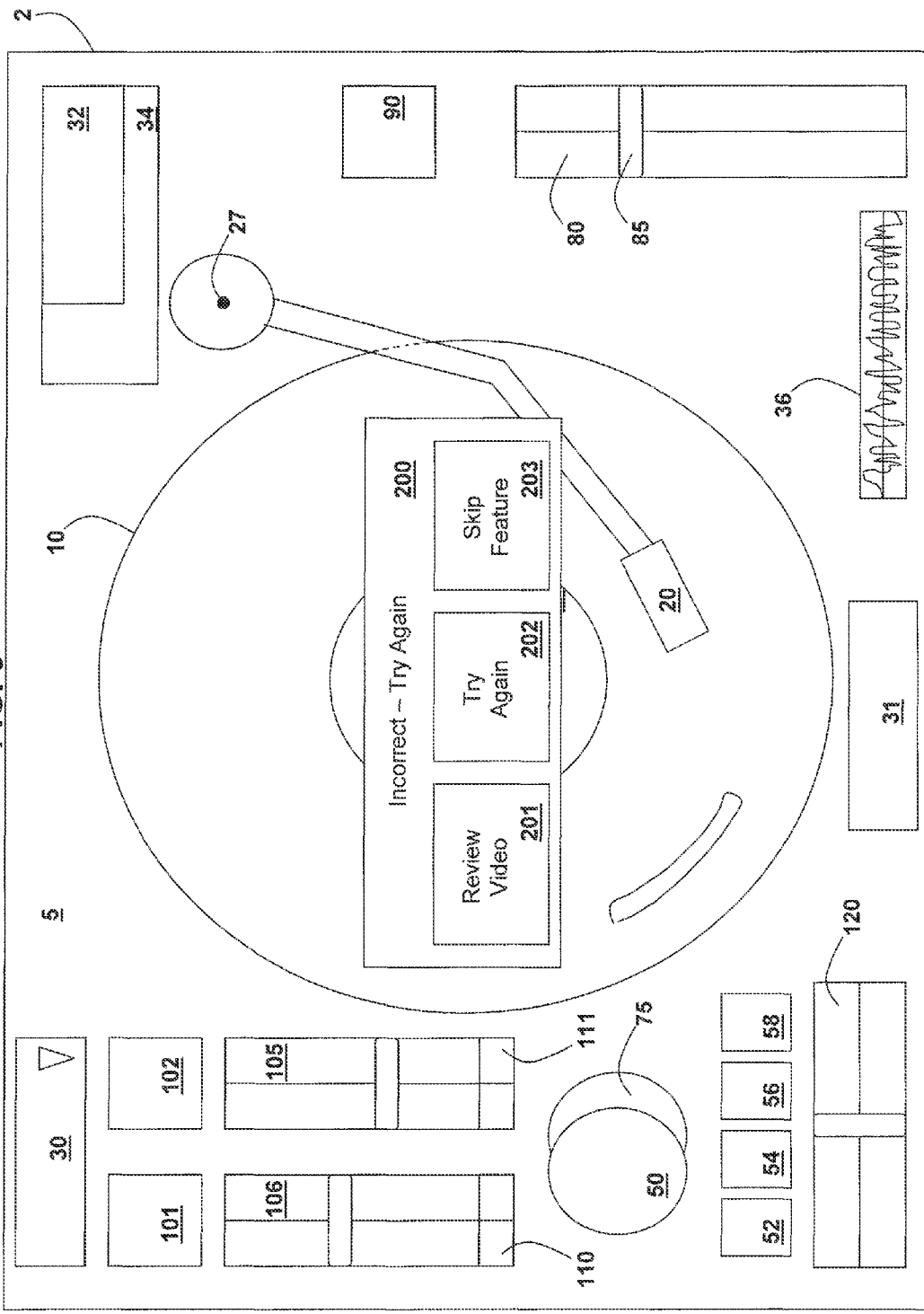
FIG. 5 shows an exemplary schematic view of the user interface when a user has performed an incorrect action during tutorial mode in accordance with some embodiments of the invention.

Tutorial, selected in the screen of FIG. 3, is a mode of operation which trains a user by use of interactive exercises and video. When a selection by a user is expected, features that can be selected will be highlighted. When a feature is selected by the user, an audio/video demonstration will be presented to the user. Users can replicate the steps shown in the demonstration. Correct responses allow the user to move to the next feature. Incorrect actions will get an error message 200 and a prompt to review the video example, to try again or to skip to another feature, as shown by controls 201, 202 and 203, respectively, in exemplary FIG. 5. Videos are triggered by the feature selected and can appear in video display window 34. Features can be selected in any order to allow for specific inquiries. Touching another feature during playback of a tutorial video will skip to that feature and trigger the next video.

Figure 6:
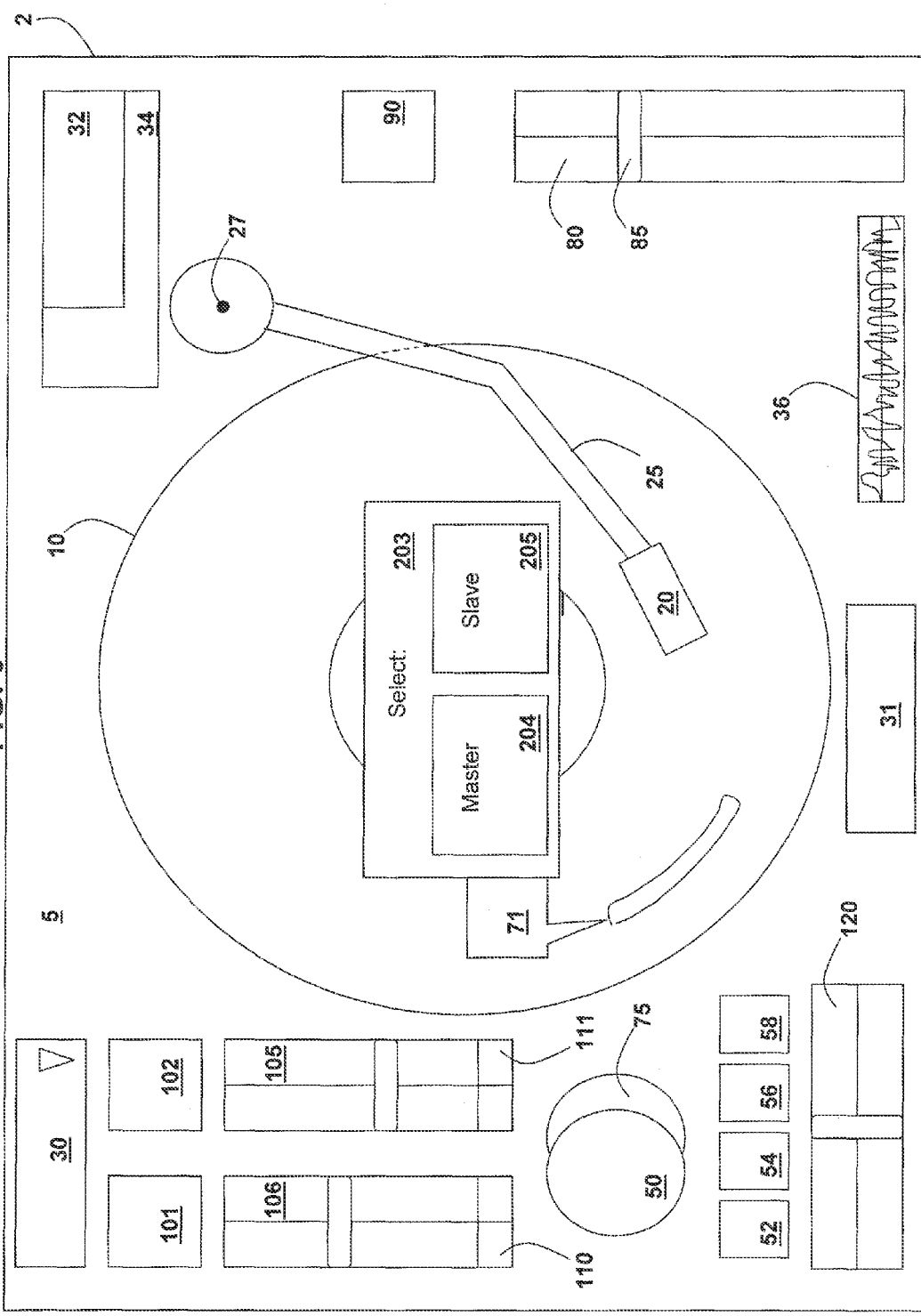
FIG. 6 shows an exemplary schematic view of the user interface when selecting a primary unit to display the mixer in accordance with some embodiments of the invention.

Upon starting up of the present invention, if a second instance of the present invention is detected and running in system memory, a prompt window such as the window 203 of FIG. 6 will pop up on the screen to allow the user to select whether the present instance is the primary or secondary system by use of controls 204 and 205, respectively.

An additional, external device may be detected by the present invention upon either start-up of the present invention or upon a hot-plug-in of the external device. If the external device is not an instance of the present invention, a prompt window such as the window 206 of FIG. 8 may be displayed to query the user whether the detected device is an audio/video playback device. If affirmative, then a new channel opens in the mixer; if negative, then a prompt window such as the window 207 of FIG. 9 may be displayed to query the user whether the detected device is an external mixer. An affirmative response to window 207 will cause the mixer to disappear from the display on the primary unit.

Figure 7:
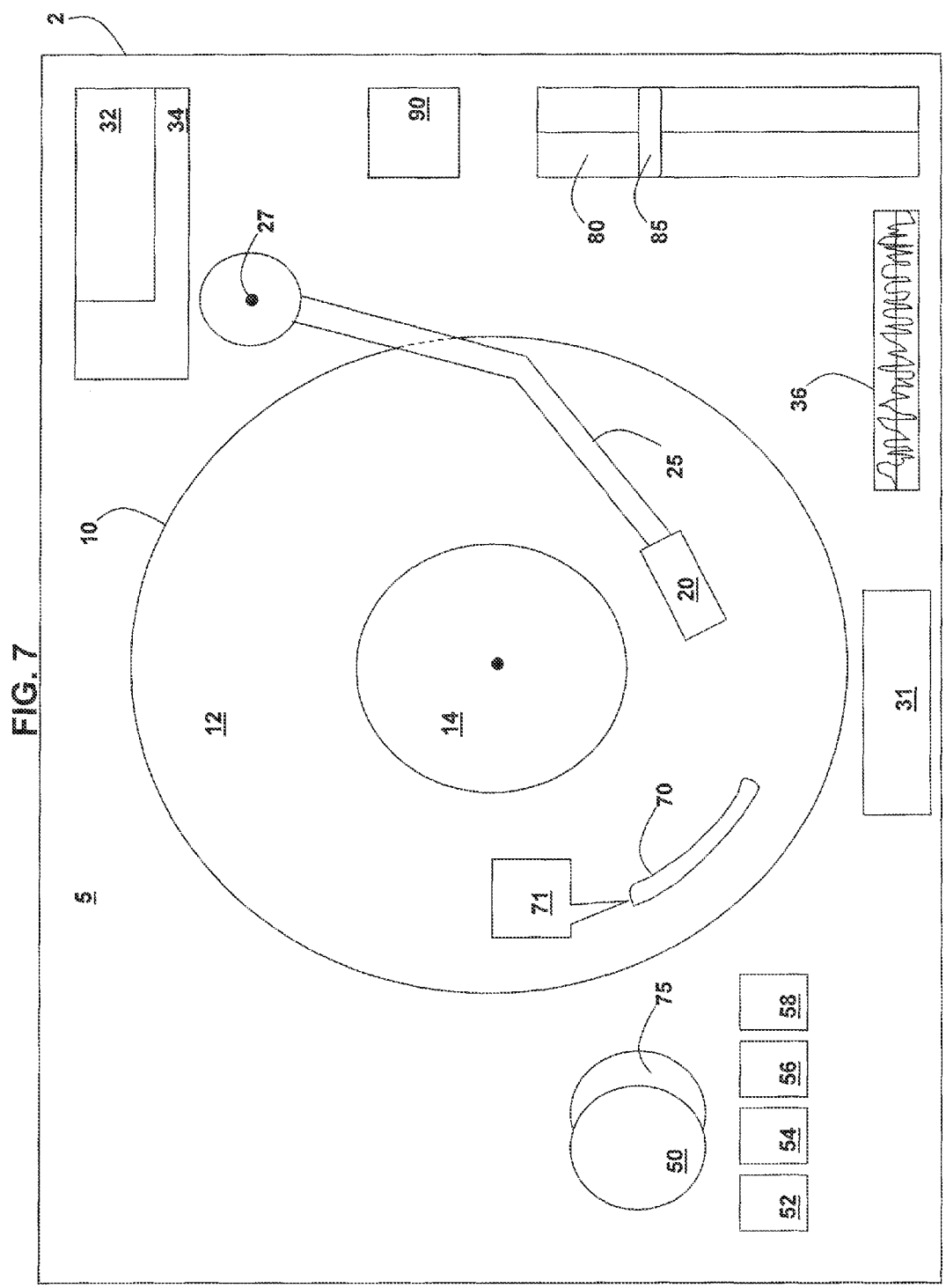
FIG. 7 shows an exemplary schematic view of the user interface applicable to a secondary unit in accordance with some embodiments of the invention.

Once primary/secondary system status is determined, the secondary unit's mixer controls will not be displayed, with the exception of the cue point options, as shown in FIG. 7. The primary unit will assume the function of a mixer unless an external mixer is selected by the user through dialog box 206 of FIG. 8. The external mixer is a third selectable device, in addition to the primary and secondary system. A non-limiting exemplary configuration includes two virtual turntables as the primary and secondary systems, and the external mixer. When the user selects the external mixer, both the primary system and the secondary system will become slaves to the external mixer during playback of the audio file. If the user selects an external mixer through dialog box 207 of FIG. 9, the present invention will act as a record player and as a secondary system under the control of the mixer of the primary system. If the present invention is designated as a primary system, it will assume the role of mixer as well. In this situation, the song title, artist, BPM and track time for the song playing on each virtual turntable will be displayed in windows 101 and 102, respectively.

Source volume controls 105, 106 allow the volume level of each turntable in a dual-turntable system to be controlled during mixing, with the crossfader phasing (i.e., controlling the transition) from one turntable to the other as determined by the disk jockey ("DJ").

Just below the source volume controls 105, 106 are CD controls that will allow the DJ to control the music on both turntables with play/pause, rewind and fast forward options. The CD controls also are operable with the image of a vinyl record. They provide alternate controls for a DJ who uses a CD/DVD turntable rather than a turntable that plays vinyl records. Controls may be highlighted and change color when in use.

Figure 8:
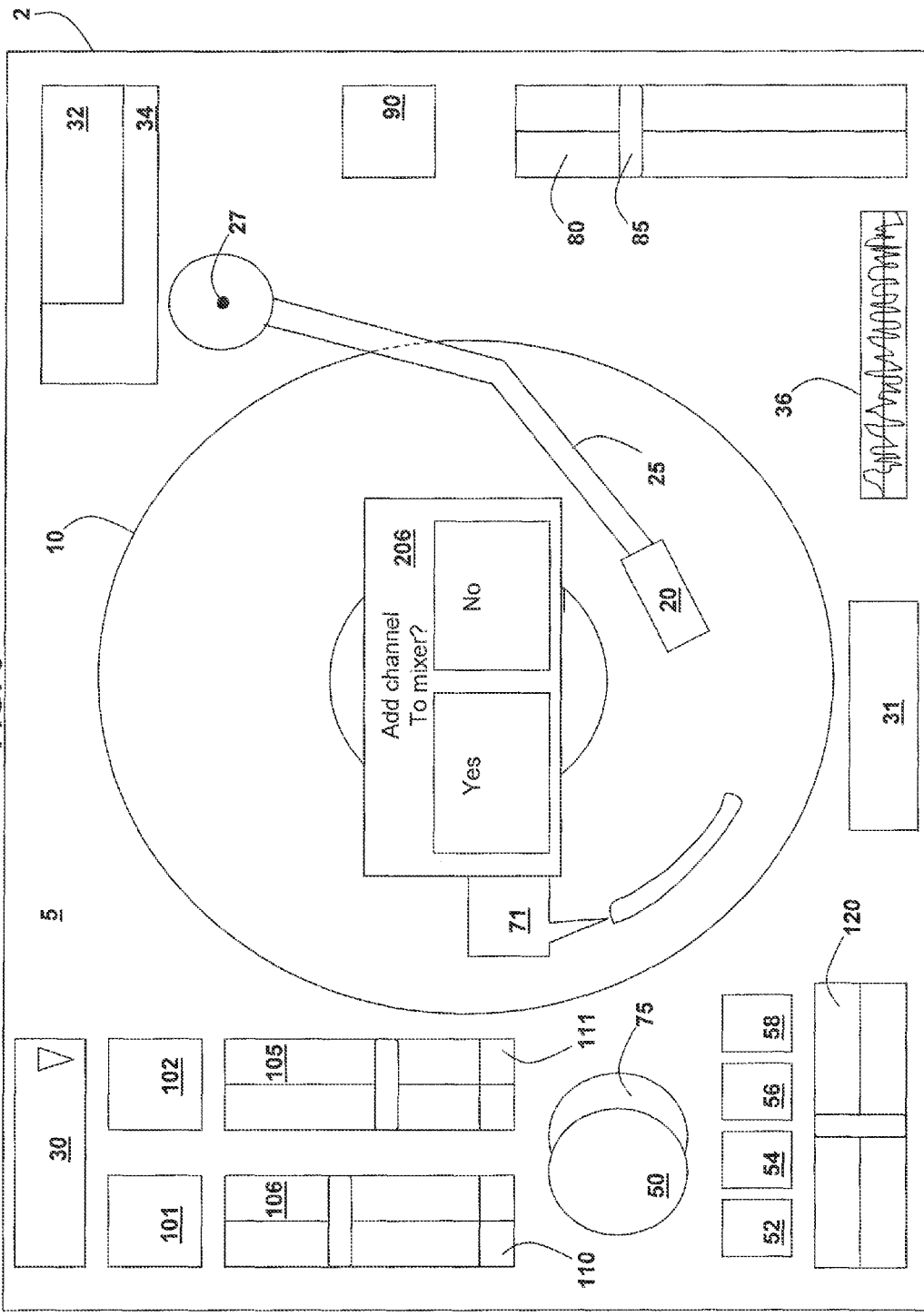
FIG. 8 shows an exemplary schematic view of the user interface when prompting whether to add a channel to the mixer in accordance with some embodiments of the invention.
Figure 9:
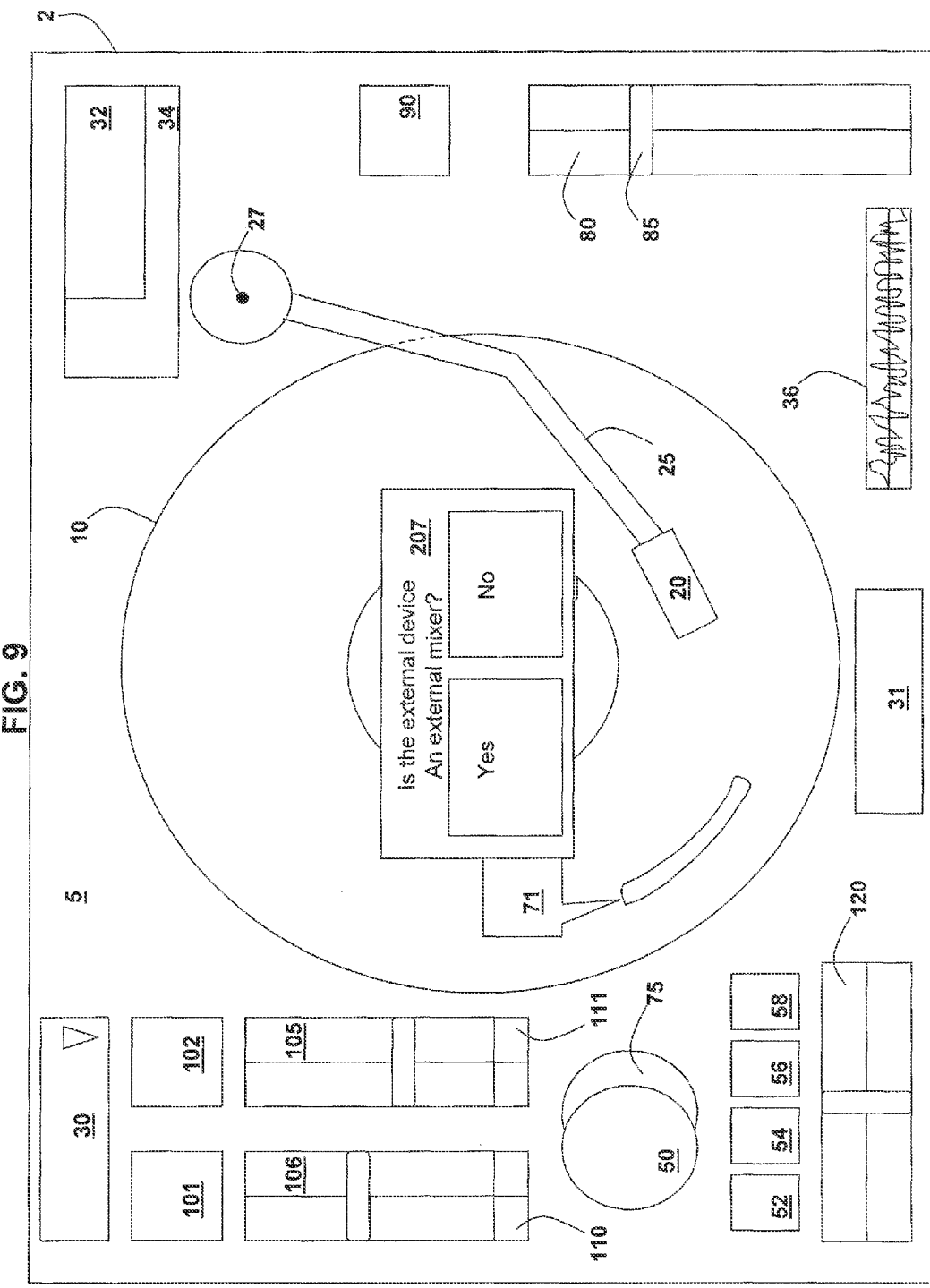
FIG. 9 shows an exemplary schematic view of the user interface when selecting an external mixer in accordance with some embodiments of the invention.
Figure 10:
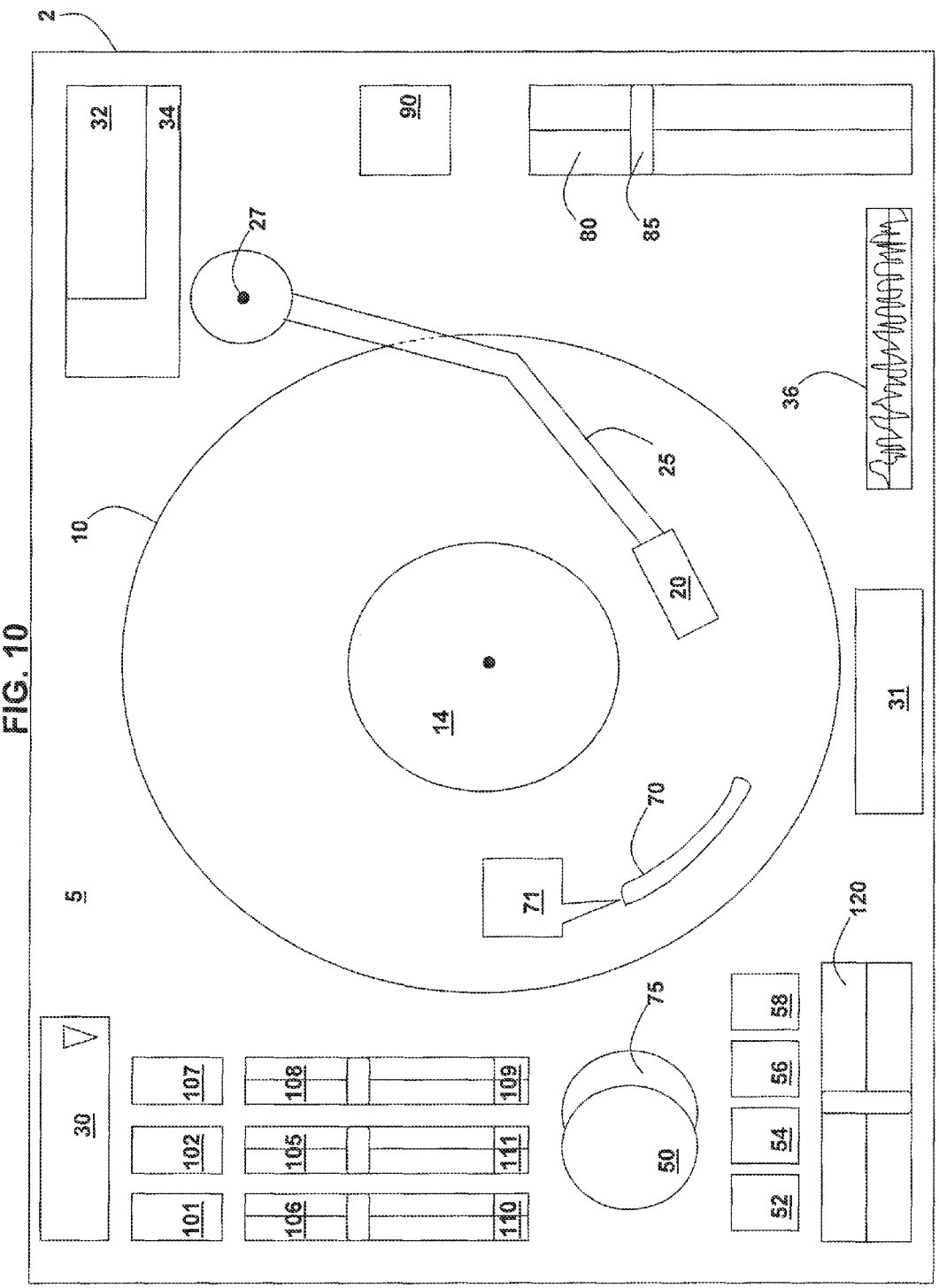
FIG. 10 shows an exemplary schematic view of the user interface when additional source volume controls are added in accordance with some embodiments of the invention.

If the dialog box of FIG. 8 is answered in the affirmative, then additional controls for additional mixers can be added, with levels of the additional mixers controlled by additional source volume controls as shown in FIG. 10. Prompts can appear with each new device detected to ask if the detected unit is an audio/video playback device—if affirmative, then a new channel is added in the mixer; if negative, then the present invention asks if the new device is an external mixer.

FIG. 10 illustrates additional display windows and controls such as 107, 108 and 109, similar to display window 102, volume control 105 and source mode control 111, respectively, that can be displayed and highlighted for each added mixer channel, for easy control of the resulting mix. If the new device is another instance of the present invention, then the track details will appear in the window display 107. If the new device is of unknown origin, then 'Unknown' will appear in the display window 107. Additional display windows and controls for additional external inputs can be added adjacent or near to the equivalent windows for other inputs, as illustrated in FIG. 10, and can be selected by touch of the window screen to assign which two channels will be dominant in the mix. The additional inputs will be mixed in mainly by volume controls using the crossfader to favor their side and bring them up in the mix.

Figure 11:
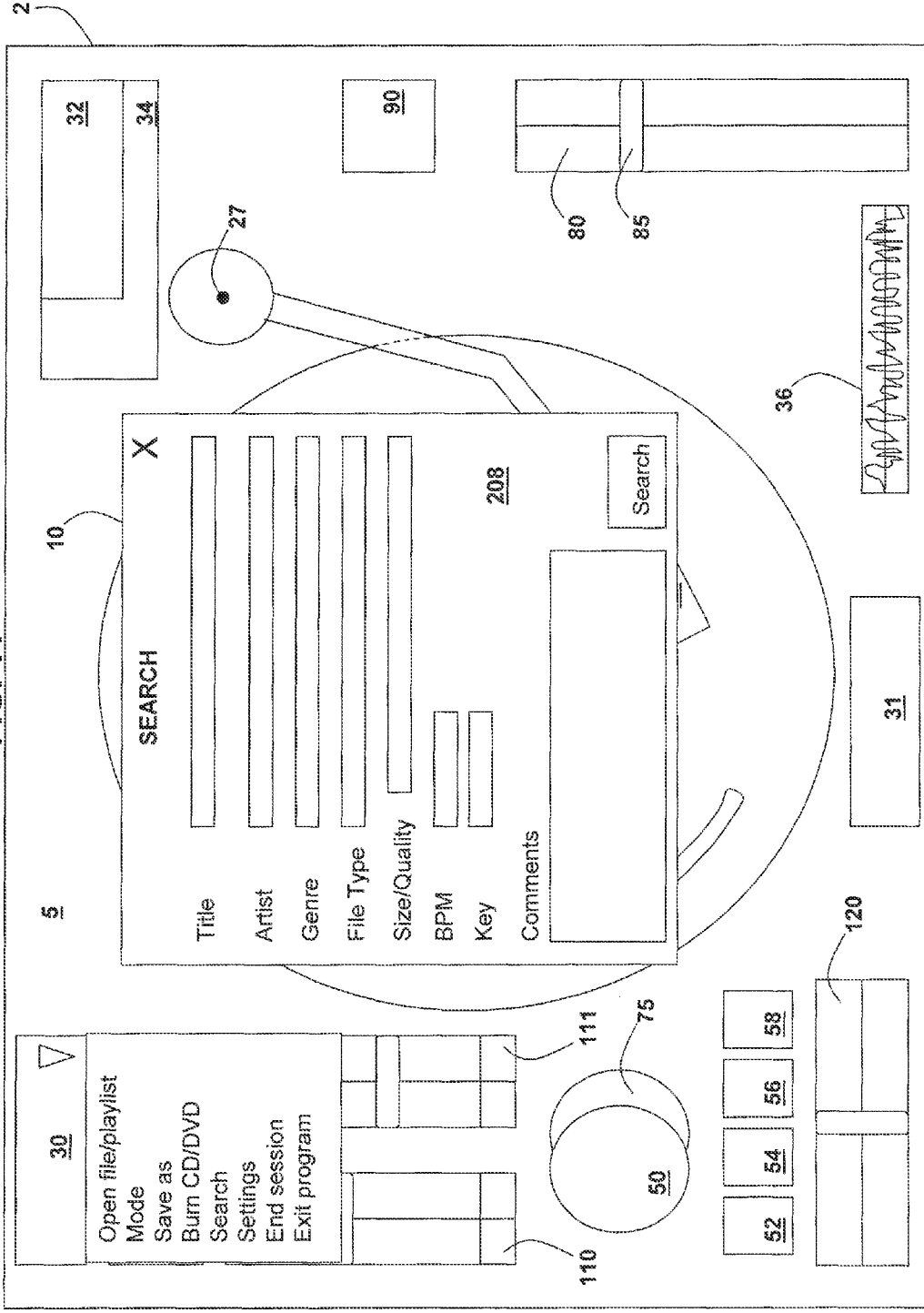
FIG. 11 shows an exemplary schematic view of the user interface when searching for a song or video in accordance with some embodiments of the invention.

A user of embodiments of the present invention will need to find a song or video at some point in typical usage. The user can open a file to assign to the turntable by using the 'Open File/playlist' or 'Search' option on the pull down menu 30. FIG. 11 shows an exemplary dialog window 208 that can be displayed upon selection of this menu choice. Once the song is selected, information display 32 and/or video display 34 can display the song title, artist, track time, BPM (Beats Per Minute) and currently selected cue point (if those are preset) as a scrolling text. Video display 34 may be dynamically resizable to display the video in a preferred display size and/or resolution, and to allow space to display related textual information such as title, time/duration and cue points. Some or all of the related textual information may also be displayed on label portion 14 of record 10, with the textual information animated to rotate at the same rate as record 10, to simulate the rotation of a physical label 14.

Cue points 70 may be highlighted on the record. Upon selection of the highlighted cue point 70, a balloon 71 may appear with the cue point details.

Another task that a user of embodiments of the present invention may perform is the recording of a mix session. Automating recording of a mix session may occur as a background script programmed to check compatibility (e.g., file extension, program compatibility), save compression settings, default and customizable settings (i.e., preset to club quality), including a prompt to save this information before shutting down the system. The system may then open a 'Save as' window to name file and select location to save the mix, using standard dialog windows. In addition, the system may create a temporary file as the music is mixed, e.g., by use of a memory cache, thereby saving a recording of the mix as it is played through the mixer. Tags such as artist/song title/BPM, etc. for the songs may be included. A visual indicator may be provided when the mix is being recorded.

Figure 12:
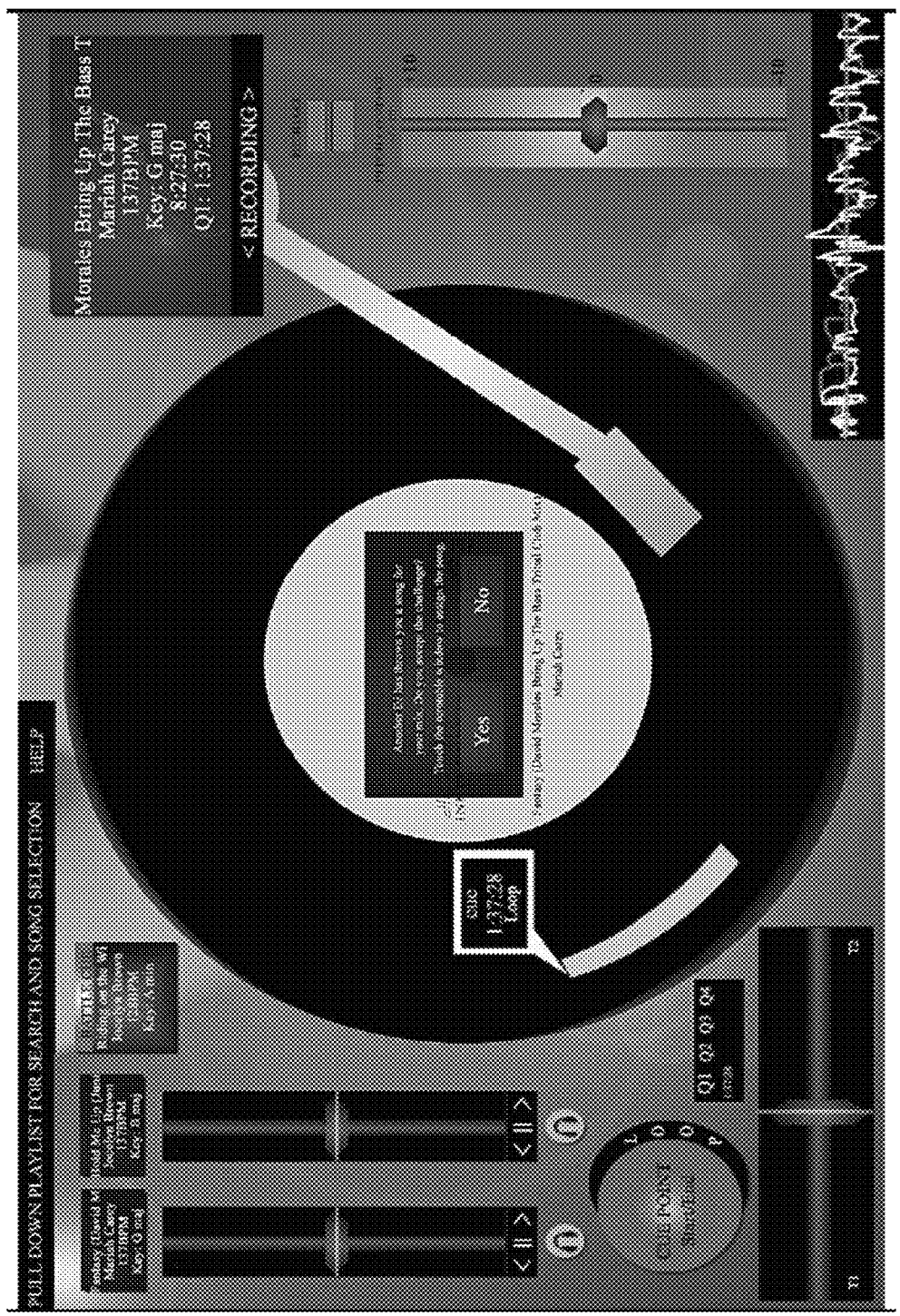
FIG. 12A shows an exemplary schematic view of th two connected systems.
FIG. 12B shows an exemplary schematic of view of the one system user throwing a song to another system user.
FIG. 12C shows an exemplary schematic view of the user interface when a battle cue feature is provided.
Figure 12A:
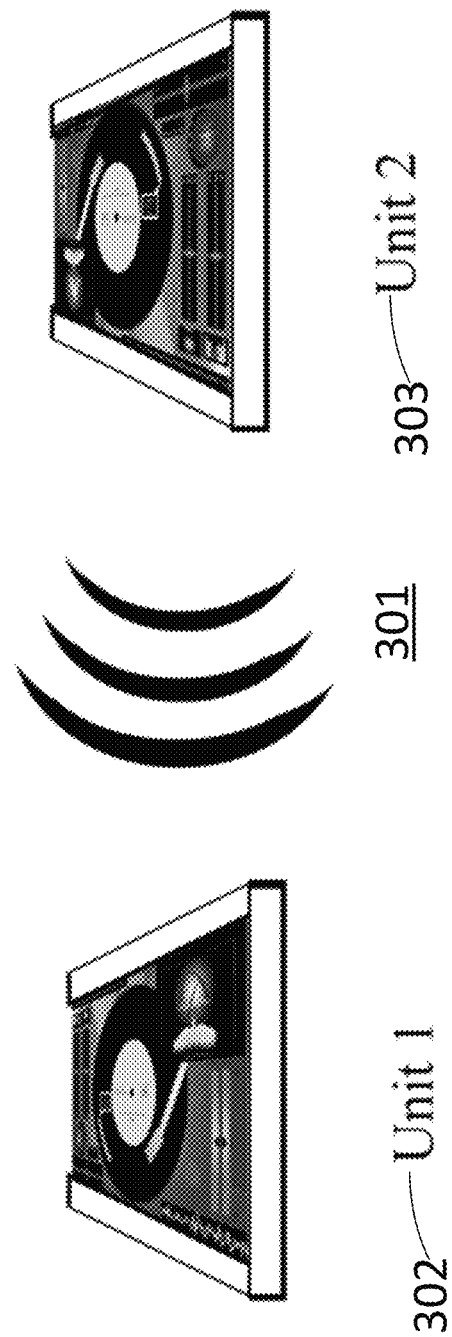
Figure 12B:
Figure 12C:
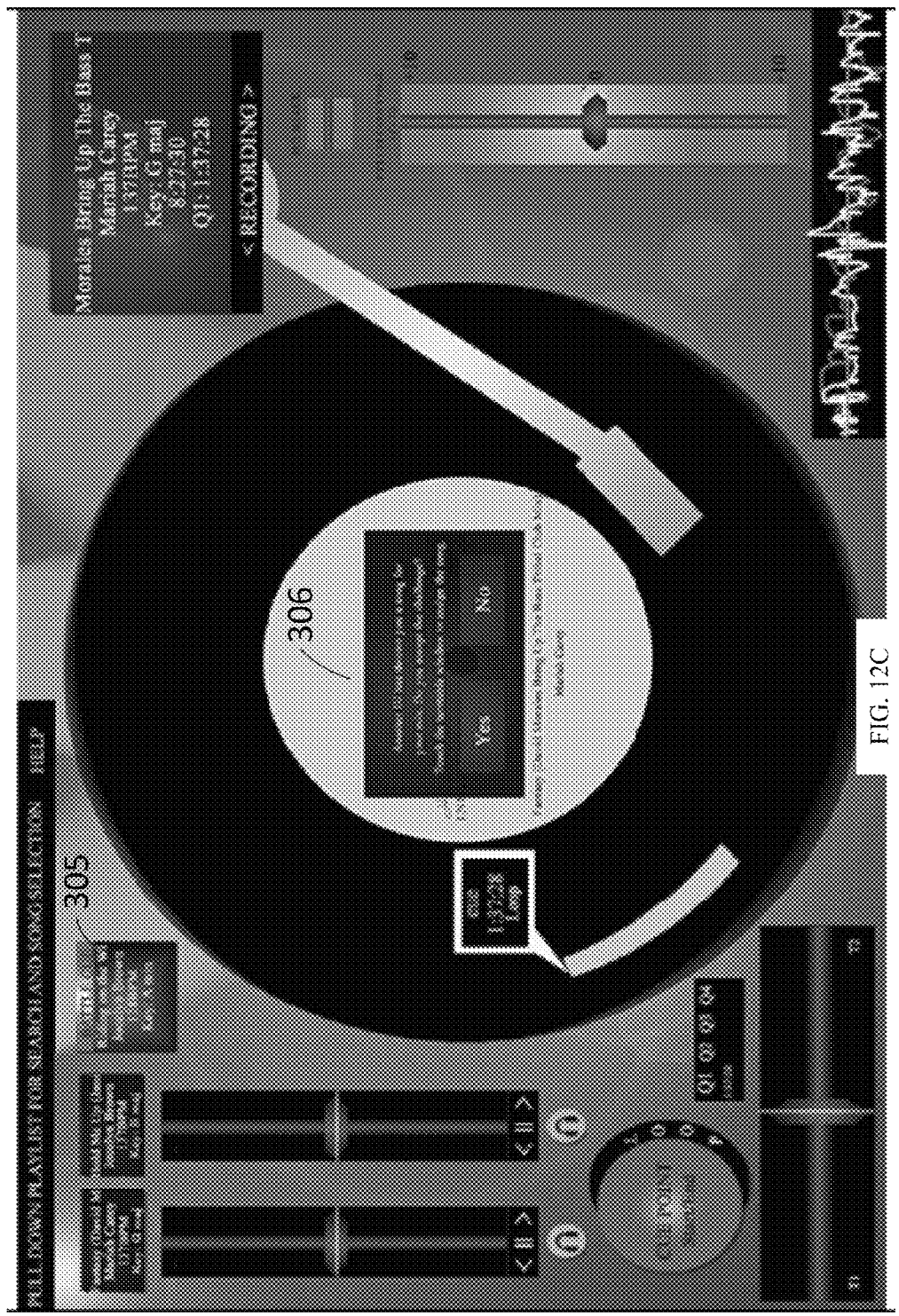

As shown for example in FIGS. 12A-12C, a "battle cue" feature may be provided, wherein via, for example, a wireless connection such as a WiFi connection 301, two or more systems 302, 303, of the present invention can share songs in a mix mode, as shown in FIG. 12A. The battle cue feature and method is used to allow a second DJ (i.e., a second user) 303 to challenge a first DJ by sharing a song between devices for the other DJ to mix into their set. As shown in FIG. 12B, the DJ operating the second system 303 can add the song (i.e., "throw" it) 304 to add the song to the mix of the first system 302. The song can then appear in a battle cue window 305 next to the mixer functions. As shown in FIG. 12C, an indicator 306 can alert the DJ of the first system and a prompt will appear to ask if the first DJ accepts the challenge. The first DJ can accept or decline the battle cue. If the first DJ accepts the challenge, the system will allow the DJ to indicate the window of the turntable they wish to assign the song to. Throwing the song from the second system can be done by touching the image of the record 10 and pushing it like a Frisbee 304 to the top of the screen in the direction of the intended device.

Throwing a song in this way may utilize knowledge of the location of other nearby systems. Such knowledge of locations may be knowledge of actual locations as derived from methods such as triangulation, user input, or inputs from a position-locating system (e.g., GPS). Alternatively, locations of other nearby systems may be represented conceptually such that the representation on screen of a direction to a nearby system does not necessarily correspond to the physical direction. For example, the present system may be represented as being located at a hub, and one or more secondary systems can be represented as equally-spaced locations arranged circularly around the hub. The representations of the user interface in this regard are at the discretion of software system design.

Virtual manipulation of the stylus and record provide many advantages over conventional records and turntables. Manipulation of conventional equipment induces wear and possible damage to the "vinyl" record and turntable equipment. In addition, by creating playback points, cue points, and loops, playback may be more accurately controlled and repeatable.

It should be noted that while various features of the virtual phonograph system are described herein as being operated by using the touch screen 2, it should be understood that it is also within the scope of the invention for those features to be operated using other input means, as described above. By way of example only, features may be operated using a keyboard, mouse, pull down menu, or other input device. In such embodiments, activation may be customized by the user. For example, a feature may be assigned to a hotkey or keystroke sequence. As another example, the user may use a mouse and select a feature by moving the mouse point over the feature's control on the screen 2, and pressing a mouse key. These examples are not meant to be limiting, and other methods of operating features may be used within the scope of the invention as will be understood by those of ordinary skill in the art.

Those skilled in the art will recognize that the materials and methods of the present invention will have various other uses in addition to the above described embodiments. They will appreciate that the foregoing specification and accompanying drawings are set forth by way of illustration and not limitation of the invention. It will further be appreciated that various modifications and changes may be made therein without departing from the spirit and scope of the present invention.

What is claimed is:

1. A processor-implemented method to control a playback of recorded sound, comprising the steps of:
   displaying on a pressure-sensitive display screen a processor-generated image of a vinyl record;
   playing, by use of a processor in communication with a processor storage, a sound encoded in the processor storage, to produce a playback of the encoded sound;
   animating the processor-generated image of the vinyl record, to produce an animation of the vinyl record rotating in synchronicity with the playback;
   detecting touch on the animation; and
   controlling the playback and the animation in response to the detected touch, wherein the controlling of the playback and the animation includes adjusting a speed of the playback and a speed of the corresponding vinyl record rotation in correlation with an amount of pressure exerted by the detected touch on a portion of the pressure-sensitive screen that is used to display the image of the vinyl record;
   detecting, by use of the processor, at least one external playback device;
   establishing a separate connection with one or more of the at least one detected external playback device;
   enabling a user to initiate a battle cue challenge with another user by sending a battle cue song, video, or other media, including at least one cue point to one of the connected external playback devices that is used by the another user, wherein the sending of the battle cue song, video, or other media to one of the connected external playback devices includes:
   detecting (1) a touch of one of (i) the processor-generated image of the vinyl record or (ii) a cue point that is graphically overlaid on the vinyl record image followed by (2) a touching motion of sliding a selected image across the pressure-sensitive display screen to a top of the display screen in a direction of the intended one of the connected external playback devices; and
   transmitting the battle cue song, video, or other media to the intended one of the connected external playback devices through the corresponding established separate connection;
   wherein a cue point includes at least one of: a song, a part of a song, a part of an encoded sound, a beat sample, a bridge, a vocal line, a video clip and a part of a video clip;
   generating a battle cue window on the pressure-sensitive display screen; and
   wherein the direction of the intended one of the connected external playback devices is determined based on knowledge of a location of the intended one of the connected external playback devices and wherein the knowledge of the location includes an actual physical location of the intended external playback device and a conceptual location of the intended external playback device based on one of a triangulated location point, a user provided input, or an input from a position locating system, that is related to the actual physical location of the intended external playback device.

2. The method of claim 1, wherein at least one of the connections established with the one or more of the at least one external playback device includes a wireless connection.

3. The method of claim 1, further comprising:
   in response to receiving a battle cue challenge from one of the connected external playback devices, displaying in the battle cue window the received battle cue song, video, or other media;
   enabling the user to choose to accept or decline the received battle cue challenge using a prompt window displayed on the pressure-sensitive display screen; and
   if the user accepts the received battle cue challenge, enabling the user to mix the received battle cue song, video, or other media with the playback being played.

4. The method of claim 3, further comprising playing the received battle cue song, video, or other media through a selected speaker including a headphone speaker for the user and wherein the user is a disk jockey.

5. The method of claim 3, further comprising assigning an existing mixer channel or creating a new mixer channel for the received battle cue song, video, or other media.

6. The method of claim 1, further comprising enabling a user to control at least one aspect of the playback, including pitch and tempo by providing a tempo control and a pitch lock;
   wherein the tempo control comprises a virtual sliding bar;
   wherein the pitch lock comprises a virtual button on the pressure-sensitive display screen;
   wherein the tempo control enables the user to control a tempo of the playback by adjusting the virtual sliding bar;
   and wherein the pitch lock enables the user to adjust the tempo of the playback without affecting a quality of the playback vocal by touching the virtual button.

7. The method of claim 1, further comprising enabling a user to set up at least one of one or more playbacks and a mixing of a plurality of playbacks, wherein the mixing of a plurality of playbacks includes at least one of creating one or more play lists, identifying one or more tracks in a plurality of songs or playbacks, determining beats per minutes (BPMs) and key of the identified tracks, designating one or more cue points, and setting introduction parameters of the identified tracks.

8. The method of claim 7, wherein enabling a user to set up at least one of one or more playbacks and mixing of a plurality of playbacks further comprises storing information including details of the one or more playbacks or the mixing of the plurality of playbacks and exporting the information.

9. A system to control playback of recorded sound, comprising:
   a processor in communication with a processor storage, the processor configured to play a sound encoded in the processor storage, to produce a playback of the encoded sound; and
   a pressure-sensitive display screen in communication with the processor, wherein:
   the display screen is configured to display a processor-generated image of a sound recording medium including an image of a vinyl record;
   the display screen is configured to display a processor-generated animation of the image of the sound recording medium, the processor-generated animation of the vinyl record rotating in synchronicity with the playback;

the display screen is configured to detect touch on the animation;

the display screen is configured to display a processor-controlled animation, the playback and the animation responsive to the detected touch, to control the playback and the animation, wherein the controlling of the playback and the animation includes adjusting a speed of the playback and a speed of the corresponding vinyl record rotation in correlation with an amount of pressure exerted by the detected touch on a portion of the pressure-sensitive screen that is used to display the image of the vinyl record;

wherein the processor is further configured to:
  detect at least one external playback device; and
  establish a separate connection with one or more of the at least one detected external playback device; and the pressure-sensitive display screen is further configured to:
  enable a user to initiate a battle cue challenge with another user by sending a battle cue song, video, or other media including at least one cue point to one of the connected external playback devices that is used by the another user, wherein the sending of the battle cue song, video, or other media to one of the connected external playback devices includes:
  detecting (1) a touch of one of (i) the processor-generated image of the vinyl record or (ii) a cue point that is graphically overlaid on the vinyl record image followed by (2) a touching motion of sliding a selected image across the pressure-sensitive display screen to a top of the display screen in a direction of the intended one of the connected external playback devices; and
  generate a battle cue window at the intended one of the connected external playback devices; and
  wherein a cue point includes at least one of a song, a part of a song, a part of an encoded sound, a beat sample, a bridge, a vocal line, a video clip and a part of a video clip;
  wherein the processor is further configured to transmit the battle cue song, video, or other media to the intended one of the connected external playback devices through the corresponding established separate connection; and wherein the direction of the intended one of the connected external playback devices is determined based on knowledge of a location of the intended one of the connected external playback devices and wherein the knowledge of the location includes an actual physical location of the intended external playback device and a conceptual location of the intended external playback device based on one of a triangulated location point, a user provided input, or an input from a position locating system, that is related to the actual physical location of the intended external playback device.

10. The system of claim 9, wherein at least one of the connections established with the one or more of the at least one external playback device includes a wireless connection.

11. The system of claim 9, wherein the pressure-sensitive display screen is further configured to:
  display the battle cue song, video, or other media in the battle cue window in response to receiving the battle cue challenge from one of the connected external playback devices;
  enable the user to choose to accept or decline the received battle cue challenge using a prompt window; and
  enable the user to mix the received battle cue song, video, or other media with the playback being played, if the user accepts the received battle cue challenge.

12. The system of claim 10, wherein the pressure sensitive display screen is further configured to assign an existing mixer channel or create a new mixer channel for the received battle cue song, video, or other media.

13. The system of claim 9, wherein the pressure-sensitive display screen is further configured to enable a user to control at least one aspect of the playback, including pitch and tempo by providing a tempo control and a pitch lock;
  wherein the tempo control comprises a virtual sliding bar;
  wherein the pitch lock comprises a virtual button;
  wherein the tempo control enables the user to control a pitch and a tempo of the playback by adjusting the virtual sliding bar;
  and wherein the pitch lock enables the user to adjust the tempo of the playback without affecting a quality of the playback vocal by touching the virtual button.

14. The system of claim 9, wherein the pressure-sensitive display screen is further configured to enable a user to set up at least one of one or more playbacks and a mixing of a plurality of playbacks, wherein the mixing of a plurality of playbacks includes at least one of creating one or more play lists, identifying one or more tracks in a plurality of songs or playbacks, determining beats per minutes (BPMs) and key of the identified tracks, designating one or more cue points, and setting introduction parameters of the identified tracks.

15. The system of claim 14, wherein the processor is further configured to:
  store information including details of the mixing of the one or more playbacks or the plurality of playbacks; and
  export the information.

16. A non-transitory computer-readable medium containing computer executable instructions that, when executed by a processor, cause the processor to perform a method for controlling playback of a recorded sound, the method comprising:
  displaying on a pressure-sensitive display screen a processor-generated image of a sound recording medium including an image of a vinyl record;
  playing, by use of a processor in communication with a processor storage, a sound encoded in the processor storage, to produce a playback of the encoded sound;
  animating the processor-generated image of the sound recording medium, to produce an animation of the vinyl record rotating in synchronicity with the playback;
  detecting touch on the animation; and
  controlling the playback and the animation in response to the detected touch, wherein the controlling of the playback and the animation includes adjusting a speed of the playback and a speed of the corresponding vinyl record rotation in correlation with an amount of pressure exerted by the detected touch on a portion of the pressure-sensitive screen that is used to display the image of the vinyl record;
  detecting at least one external playback device;
  establishing a separate connection with one or more of the at least one detected external playback device;
  sending a battle cue song, video, or other media including at least one cue point to one of the connected external playback devices that is used by the another user, wherein the sending of the battle cue song, video, or other media to one of the connected external playback devices includes:
- detecting (1) a touch of one of (i) the processor-generated image of the vinyl record or (ii) a cue point that is graphically overlaid on the vinyl record image followed by (2) a touching motion of sliding a selected image across the pressure-sensitive display screen to a top of the display screen in a direction of the intended one of the connected external playback devices; and
- transmitting the battle cue song, video, or other media to the intended one of the connected external playback devices through the corresponding established separate connection;
- generating on the pressure sensitive display screen a processor-generated image of a battle cue window; and
- wherein a cue point includes at least one of a song, a part of a song, a part of an encoded sound, a beat sample, a bridge, a vocal line, a video clip and a part of a video clip; and
- wherein the direction of the intended one of the connected external playback devices is determined based on knowledge of a location of the intended one of the connected external playback devices and wherein the knowledge of the location includes an actual physical location of the intended external playback device and a conceptual location of the intended external playback device based on one of a triangulated location point, a user provided input, or an input from a position locating system, that is related to the actual physical location of the intended external playback device.

* * * * *